(12) United States Patent
Ohno

(10) Patent No.: US 12,223,774 B2
(45) Date of Patent: Feb. 11, 2025

(54) JUDGEMENT METHOD, JUDGEMENT DEVICE, AND JUDGEMENT PROGRAM

(71) Applicants: Swallow Incubate Co., Ltd., Ibaraki (JP); Panasonic Holdings Corporation, Osaka (JP)

(72) Inventor: Toshikazu Ohno, Ibaraki (JP)

(73) Assignees: SWALLOW INCUBATE CO., LTD., Ibaraki (JP); PANASONIC HOLDINGS CORPORATION, Osaka (JP)

( * ) Notice: Subject to any disclaimer, the term of this patent is extended or adjusted under 35 U.S.C. 154(b) by 382 days.

(21) Appl. No.: 17/828,482

(22) Filed: May 31, 2022

(65) Prior Publication Data

US 2022/0292883 A1 Sep. 15, 2022

Related U.S. Application Data

(63) Continuation of application No. PCT/JP2021/021989, filed on Jun. 9, 2021.

(30) Foreign Application Priority Data

Dec. 22, 2020 (JP) .................................. 2020-212909

(51) Int. Cl.
*G06V 40/40* (2022.01)
*G06F 21/32* (2013.01)
*G06V 40/16* (2022.01)

(52) U.S. Cl.
CPC ............ *G06V 40/45* (2022.01); *G06V 40/161* (2022.01); *G06V 40/171* (2022.01); *G06F 21/32* (2013.01); *G06T 2207/30201* (2013.01)

(58) Field of Classification Search
CPC .... G06V 40/45; G06V 40/161; G06V 40/171; G06V 40/16; G06V 40/18; G06F 21/32; G06T 2207/30201; G06T 7/00
See application file for complete search history.

(56) References Cited

U.S. PATENT DOCUMENTS 9,985,963 B2 * 5/2018 He ....................... G06V 40/172
2015/0227781 A1 8/2015 Morishita
(Continued)

FOREIGN PATENT DOCUMENTS

JP 2007/249587 9/2007
JP 2016-9453 1/2016
(Continued)

OTHER PUBLICATIONS

International Search Report issued Aug. 17, 2021 in International (PCT) Application No. PCT/JP2021/021989 with partial English translation.

*Primary Examiner* — Amandeep Saini
*Assistant Examiner* — Andrew S Budisalich
(74) *Attorney, Agent, or Firm* — Wenderoth, Lind & Ponack, L.L.P.

(57) ABSTRACT

A judgement method includes: selecting two or more living body judgement processes among a plurality of living body judgement processes; determining an order of executing the two or more selected living body judgement processes; executing the two or more selected living body judgement processes in the determined order; executing, in each of the two or more selected living body judgement processes: a processing of showing a subject an action required; a processing of acquiring a facial image containing a face of the subject when acting in accordance with the shown action; and a processing of judging whether the subject is of living body based on a feature of a section of the face contained in the facial image; and judging that the subject is of living body when judgement results obtained from the two or more selected living body judgement processes satisfy a predetermined condition.

13 Claims, 15 Drawing Sheets

(56) References Cited

U.S. PATENT DOCUMENTS

| | | | |
|---|---|---|---|
| 2015/0379332 A1 | 12/2015 | Matsunaga et al. | |
| 2017/0228586 A1 | 8/2017 | Morishita | |
| 2020/0026906 A1 | 1/2020 | Ajiki et al. | |
| 2020/0082161 A1 | 3/2020 | Morishita | |
| 2020/0257914 A1* | 8/2020 | Wu | G06V 40/169 |
| 2020/0302618 A1* | 9/2020 | Zhang | G06V 40/176 |
| 2022/0019650 A1 | 1/2022 | Takano et al. | |
| 2022/0075999 A1 | 3/2022 | Morishita | |

FOREIGN PATENT DOCUMENTS

| | | |
|---|---|---|
| JP | 2017-49867 | 3/2017 |
| JP | 2018-169943 | 11/2018 |
| JP | 2018-173731 | 11/2018 |
| JP | 6544244 | 7/2019 |
| WO | 2016/059786 | 4/2016 |
| WO | 2020/110306 | 6/2020 |

* cited by examiner

JUDGEMENT METHOD, JUDGEMENT DEVICE, AND JUDGEMENT PROGRAM

TECHNICAL FIELD

The present disclosure relates to a technology for judging whether a subject contained in an image is of living body.

BACKGROUND ART

Owing to the progression in online systems and services in recent years, identity verifications, which were conventionally conducted face-to-face, have been increasingly conducted via online. In the case of conducting an identity verification via online, there has been the problem that a person commits an identity fraud by use of a still image or a moving image of a face of a different person prepared in advance. A living body judgement technology of judging whether a subject contained in an image used for an identity verification is of living body (or referred to as "living body judgement) has come to existence as a countermeasure against such identity fraud. Documents listed below are known as Patent Literatures related to the living body judgement.

For example, Patent Literature 1 discloses a technology of executing a living body judgement on the basis of specific degree of facial expression, orientation of face, degree of closure of an eye, opening-closing degree of a mouth, and orientation of a sightline acquired from a face image of a person. Patent Literature 2 discloses a technology in which a person is given instructive information, and a living body judgement is made on the basis of a sightline timeline change in accordance with the instructive information that is detected from a series of face images representing the face of the person. Patent Literature 3 discloses a technology of executing a living body judgement on the basis of a gesture of a living body, such as blinking, contained in an image bearing the living body.

Patent Literature 4 discloses a technology of executing a living body judgement on the basis of a timeline variation with respect to predetermined color information extracted from a series of face images. Patent Literature 5 discloses a technology of executing a living body judgement on the basis of two-dimensional image data and image capturing plane phase differential information of a face of an authentication target photographed by an image capturing optical system (see paragraphs [0030] to [0032]). Patent Literature 6 discloses a technology of executing a living body judgement on the basis of a detection as to whether an image bearing a target person includes a frame surrounding the face of the person.

However, further improvements are required as countermeasures against an identity fraud in the living body judgement.

CITATION LIST

Patent Literature

Patent Literature 1: Japanese Unexamined Patent Publication No. 2016-009453
Patent Literature 2: International Unexamined Patent Publication No. 2016/059786
Patent Literature 3: Japanese Unexamined Patent Publication No. 2017-049867
Patent Literature 4: Japanese Patent No. 6544244
Patent Literature 5: Japanese Unexamined Patent Publication No. 2018-173731
Patent Literature 6: Japanese Unexamined Patent Publication No. 2018-169943

SUMMARY OF INVENTION

The present disclosure has been made in order to solve the problems described above. The object of the present disclosure is to further improve countermeasures against an identity fraud in a living body judgement.

A judgement method according to an aspect of the present disclosure is a judgement method for a judgement device, and the judgement method includes: by a computer of the judgement device, selecting two or more living body judgement processes among a plurality of living body judgement processes for judging whether a subject contained in an image is of living body; determining an order of executing the two or more selected living body judgement processes; executing the two or more selected living body judgement processes in the determined order; executing, in each of the two or more selected living body judgement processes: (1) a processing of showing a subject an action required for the living body judgement process; (2) a processing of acquiring a facial image containing a face of the subject when acting in accordance with the shown action; and (3) a processing of judging whether the subject is of living body based on a feature of a section of the face contained in the facial image; determining whether judgement results obtained from the two or more selected living body judgement processes satisfy a predetermined condition; and judging that the subject is of living body when the judgement results satisfy the predetermined condition, and judging that the subject is not of living body when the judgement results fail to satisfy the predetermined condition.

DESCRIPTION OF EMBODIMENTS

Figure 1:
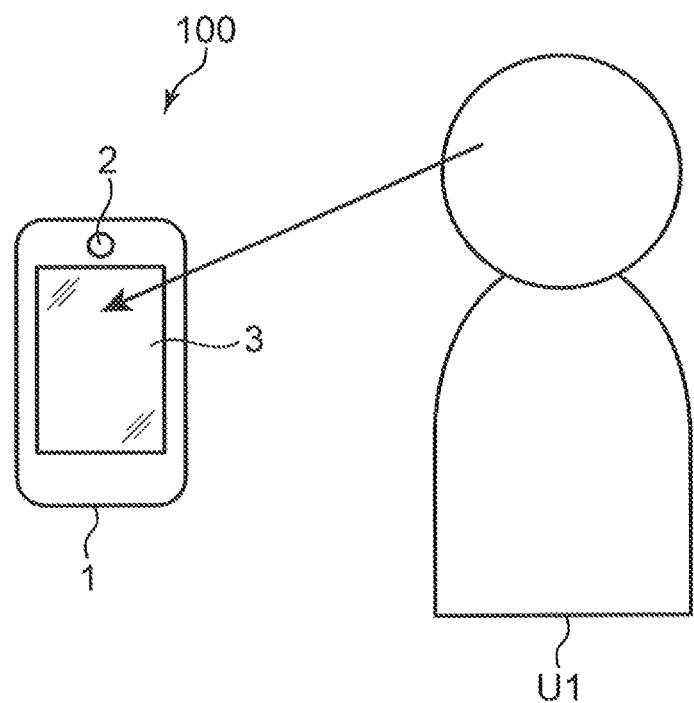
FIG. 1 is an external view of a living body judgement system according to Embodiment 1 of the present disclosure.

Circumstances that LED to the Present Disclosure

Owing to the progression in online systems and services in recent years, identity verifications, which were conventionally conducted face-to-face, have been increasingly conducted via online. For example, in the field of eKYC (electronic Know Your Customer) including opening of an online account in a financial institution, there is provided a system of completing an identity verification by submitting an identity document and a selfie via online.

Further, in recent years, biometric authentications by use of a section of a person such as a fingerprint and a face have been widespread. In particular, a facial authentication technology could be applied without requiring a contact with a person and by using an image captured by a camera having no special function. Therefore, the facial authentication technology is highly convenient and easy to introduce. For this reason, attention has been focused on the usage of the facial authentication technology as means of identity verification via online.

Because the facial authentication technology is so highly convenient, however, there has been the problem in the facial authentication technology that an identity of a different person could be easily assumed by use of an image containing a face of the different person. Living body judgement technologies of judging whether a subject contained in an image is of living body have been studied and developed by various companies in order to make a countermeasure against such identity fraud. For example, there is known a technology that during an acquisition of an image for a facial authentication, a region presumed to correspond to a face of a subject is irradiated with dot pattern light, and the subject is judged as being of living body when a face-like unevenness is detected. In addition, the living body judgement technologies disclosed in Patent Literatures 1 through 6 are known.

Here, in a case that a living body judgement is executed by fixedly adopting one of the living body judgement technologies described above, a malicious person is likely to easily prepare in advance an image to be judged by the adopted living body judgement technology as being of living body. Consequently, there is a problem that an identity fraud is liable to occur.

Accordingly, the present inventors have intensively studied a technology which allows a proper employment of a plurality of living body judgement techniques, and makes it difficult for a malicious person to use an image prepared in advance to thereby commit an identity fraud. As a result, the present inventors have conceived of each aspect of the present disclosure described below.

A judgement method according to an aspect of the present disclosure is a judgement method for a judgement device, and the judgement method includes: by a computer of the judgement device, selecting two or more living body judgement processes among a plurality of living body judgement processes for judging whether a subject contained in an image is of living body; determining an order of executing the two or more selected living body judgement processes; executing the two or more selected living body judgement processes in the determined order; executing, in each of the two or more selected living body judgement processes: (1) a processing of showing a subject an action required for the living body judgement process; (2) a processing of acquiring a facial image containing a face of the subject when acting in accordance with the shown action; and (3) a processing of judging whether the subject is of living body based on a feature of a section of the face contained in the facial image; determining whether judgement results obtained from the two or more selected living body judgement processes satisfy a predetermined condition; and judging that the subject is of living body when the judgement results satisfy the predetermined condition, and judging that the subject is not of living body when the judgement results fail to satisfy the predetermined condition.

According to the present configuration, two or more living body judgement processes are selected among a plurality of living body judgement processes, an order of executing the two or more selected living body judgement processes is determined, and the two or more selected living body judgement processes are executed in the determined order. Therefore, the execution patterns of living body judgement processes exponentially increase according to the number, the contents and the execution order of the living body judgement processes to be executed for judging whether a subject is of living body.

Further, in the present configuration, in each living body judgement process, an action required for the living body judgement process is shown to the subject, and it is judged whether the subject is of living body based on a feature of a section of the face contained in the facial image containing a face of the subject when acting in accordance with the shown action. Subsequently, it is judged whether the subject is of living body according to whether the judgement result obtained from each living body judgement processes satisfies a predetermined condition or not.

Therefore, the present configuration makes it practically impossible for a malicious person to prepare in advance a facial image including a feature of a section of the face in accordance with an action shown in each living body judgement process. As a result, the present configuration makes it difficult to commit an identity fraud by use of an image prepared in advance.

In the selection of two or more living body judgement processes in the judgement method, two or more living body judgement processes may be randomly selected among the plurality of living body judgement processes.

According to the present configuration, two or more living body judgement processes are randomly selected among the plurality of living body judgement processes. Thus, the present configuration makes it difficult for a malicious person to prepare in advance a facial image to be judged as being of living body in all the living body judgement processes.

In the determination of the order of executing the two or more selected living body judgement processes in the judgement method, the order of executing the two or more selected living body judgement processes may be randomly determined.

According to the present configuration, the order of executing the two or more selected living body judgement processes is randomly determined. Thus, the present configuration makes it difficult for a malicious person to prepare in advance a facial image to be judged as being of living body in all the living body judgement processes.

In the judgement method, the plurality of living body judgement processes may include: a living body judgement process having an orientation of the face as the feature of the section of the face; a living body judgement process having an orientation of an eye as the feature of the section of the face; a living body judgement process having an opening state of an eye as the feature of the section of the face; a living body judgement process having an opening state of a mouth as the feature of the section of the face; and a living body judgement process having a wearing state of glasses as the feature of the section of the face.

The present configuration makes it difficult to commit an identity fraud by use of an image prepared in advance owing to an execution of two or more living body judgement processes among a living body judgement process having an orientation of the face as the feature of the section of the face, a living body judgement process having an orientation of an eye as the feature of the section of the face, a living body judgement process having an opening state of an eye as the feature of the section of the face, a living body judgement process having an opening state of a mouth as the feature of the section of the face, and a living body judgement process having a wearing state of glasses as the feature of the section of the face.

In each of the two or more selected living body judgement processes in the judgement method, the processings (1) through (3) may be executed a plurality of times; and an action to be shown to the person in the processing (1) may be randomly determined.

According to the present configuration, the execution patterns of living body judgement processes exponentially increase according to the number, the contents, and the execution order of the living body judgement processes to be executed for judging whether a subject is of living body, and the number and the contents of the actions to be shown in each living body judgement process. This makes it further difficult for a malicious person to prepare in advance a facial image to be judged as being of living body.

In the selection of two or more living body judgement processes in the judgement method, a state of the subject may be detected, and a living body judgement process may be selected that shows an action suitable for the detected state of the subject.

According to the present configuration, two or more living body judgement processes requiring an action suitable for the state of the subject can be selected.

In the determination as to whether the judgement results satisfy the predetermined condition in the judgement method, the judgement result may be converted into a numerical value, the converted results may be each weighted with a coefficient specified for each living body judgement process, and when a sum of the weighted results meets a predetermined numerical criterion, the judgement results may be determined to satisfy the predetermined condition.

According to the present configuration, judgement results of the living body judgement processes each converted into a numerical value and weighted with a coefficient specified for each living body judgement process are summed. Thereafter, when the sum of the weighted results meets a predetermined numerical criterion, the judgement results are determined to satisfy the predetermined condition. Thus, the present configuration makes it possible to increase the accuracy in the judgement as to whether a subject is of living body.

The judgement method may further include, by the computer, acquiring a subject image containing the face of the subject; and determining whether the subject image includes an outer frame surrounding the face of the subject, judging that the subject is not of living body when the subject image is determined to include the outer frame, and executing the processings starting from the selection of two or more living body judgement processes when the subject image is determined to include no outer frame.

According to the present configuration, it is determined whether the acquired subject image includes an outer frame surrounding the face of the subject. Thus, the present configuration makes it possible to determine whether a subject image includes an outer frame of a photograph or a display containing the face of the subject.

When the subject image is determined to include an outer frame, it is presumed that the person intends to use the image in the photograph or the display containing the face of a different person for the living body judgement. The present configuration makes it possible that the subject is judged as not being of living body in this case. On the other hand, in the present configuration, the processings starting from the selection of two or more living body judgement processes are executed when the subject image is determined to include no outer frame. Thus, the same advantageous effects as the judgement method described above can be obtained.

In the determination as to whether the subject image includes the outer frame in the judgement method, a face region including the face of the subject may be detected from the subject image, a vertical edge line detection processing may be executed which detects, among vertically extending edge lines contained in the subject image, a first edge line closest to a left end of the face region and having a first predetermined length or greater, and a second edge line closest to a right end of the face region and having the first predetermined length or greater, and a horizontal edge line detection processing may be executed which detects, among horizontally extending edge lines contained in the subject image, a third edge line closest to an upper end of the face region, having both end points closer to the face region than the first edge line and the second edge line, and having a second predetermined length or greater, and a fourth edge line closest to a lower end of the face region, having both end points closer to the face region than the first edge line and the second edge line, and having the second predetermined length or greater; and the subject image may be determined to include the outer frame when a total number of edge lines detected in the vertical edge line detection processing and the horizontal edge line detection processing is three or more.

According to the present configuration, the face region including the face of the subject is detected from the subject image, and the vertical edge line detection processing is executed which detects, among vertically extending edge lines contained in the subject image, the first edge line and the second edge line respectively closest to the left end or the right end of the face region and having a predetermined length or greater. As a result, vertically extending two frame edges constituting the outer frame of the photograph or the display image containing the face of the subject can be detected.

Besides, a horizontal edge line detection processing is executed which detects, among horizontally extending edge lines contained in the subject image, a third edge line and a fourth edge line respectively closest to an upper end or a lower end of the face region, and having both end points closer to the face region than the first edge line and the second edge line. As a result, horizontally extending two frame edges constituting the outer frame of the photograph or the display image containing the face of the subject can be detected.

Further, according to the present configuration, the subject image is determined to include the outer frame when a total number of edge lines detected in the vertical edge line detection processing and the horizontal edge line detection processing is three or more. Thus, the present configuration makes it possible to determine that the subject image includes an outer frame when a subject image including a photograph or a display containing the face of the subject is acquired, and four frame edges are detected from the subject image. Further, the present configuration makes it possible to determine that the subject image includes an outer frame even in the case of acquiring a subject image which fails to include one of the frame edges constituting the outer frame of a photograph or a display containing the face of the subject due to an image capturing environment or the like, and thus detecting only three frame edges over the subject image.

In the determination as to whether the subject image includes the outer frame in the judgement method, a face region including the face of the subject may be detected from the subject image, and the subject image may be determined to include the outer frame when the face region has a width greater than a predetermined upper limit, or a length greater than a predetermined upper limit.

A malicious person is liable to take an image of a photograph or a display containing a face of a different person by bringing the photograph or the display close to an image capturing device so as not to include an outer frame of the photograph or the display in the image, and to cause an acquisition of the taken image as a subject image. In this case, the face region included in the subject image is liable to have a width greater than the upper limit, or a height greater than the upper limit.

However, according to the present configuration, the subject image is determined to include the outer frame, and consequently, the person corresponding to the subject image is judged as not being of living body when the face region detected from the subject image has a width greater than an upper limit, or a length greater than an upper limit. As a result, the present configuration makes it difficult for a malicious person to commit an identity fraud by use of the image as described above prepared in advance.

In the determination as to whether the subject image includes the outer frame in the judgement method, a face region including the face of the subject may be detected from the subject image, and the subject image may be determined to include the outer frame when the first edge line and the second edge line are detected in the vertical edge line detection processing while the upper end of the face region falls within a predetermined first margin from an upper end of the subject image, or the lower end of the face region falls within a predetermined second margin from a lower end of the subject image.

A malicious person is liable to take an image of a photograph or a display containing a face of a different person in such a manner that the face of the different person is located close to the upper end or the lower end of the taken image in order to hide the outer frame of the photograph or the display as much as possible, and to cause an acquisition of the taken image as a subject image. In this case, only the right and left frame edges constituting an outer frame of the photograph or the display are liable to be included in the subject image.

However, in the present configuration, the subject image is determined to include the outer frame when the vertically extending first edge line and second edge line are detected while the upper end of the face region detected from the subject image falls within a predetermined first margin from the upper end of the subject image, or the lower end of the face region falls within a predetermined second margin from the lower end of the subject image. According to the present configuration, the subject is judged as not being of living body in this case. As a result, the present configuration makes it difficult for a malicious person to commit an identity fraud by use of the image as described above prepared in advance.

In the determination as to whether the subject image includes the outer frame in the judgement method, the subject image may be determined to include the outer frame when the first edge line or the second edge line detected in the vertical edge line detection processing intersects the third edge line or the fourth edge line detected in the horizontal edge line detection processing while the left end of the face region falls within a predetermined third margin from a left end of the subject image, or the right end of the face region falls within a predetermined fourth margin from a right end of the subject image.

A malicious person is liable to take an image of a photograph or a display containing a face of a different person in such a manner that the face of the different person is located close to the left end or the right end of the taken image in order to hide the outer frame of the photograph or the display as much as possible, and to cause an acquisition of the taken image as a subject image. In this case, only L-shaped two intersecting frame edges constituting an outer frame, e.g., right and lower frame edges constituting the outer frame of the photograph or the display are liable to be included in the subject image.

However, in the present configuration, the subject image is determined to include the outer frame when the vertically extending first edge line or second edge line intersects the horizontally extending third edge line or fourth edge line, the first edge line, the second edge line, the third edge line, and the fourth edge line being detected concurrently with the presence of the left end of the face region detected from the subject image within a predetermined third margin from a left end of the subject image or the presence of the right end of the face region within a predetermined fourth margin from a right end of the subject image. According to the present configuration, the person corresponding to the subject image is judged as not being of living body in this case. As a result, the present configuration makes it difficult for a malicious person to commit an identity fraud by use of the image as described above prepared in advance.

A judgement device according to another aspect of the present disclosure includes: a judgement way determination section for selecting two or more living body judgement processes among a plurality of living body judgement processes for judging whether a subject contained in an image is of living body, and determining an order of executing the two or more selected living body judgement processes; an execution section for executing each of the two or more selected living body judgement processes in the determined order; an output section for showing, in each of the two or more selected living body judgement processes, a subject an action required for the living body judgement process; a facial image acquisition section for acquiring a facial image containing a face of the subject when acting in accordance with the shown action; and a first judgement section for judging whether the subject is of living body based on a feature of a section of the face contained in the facial image; and a second judgement section for determining whether judgement results obtained from the two or more selected living body judgement processes satisfy a predetermined condition, judging that the subject is of living body when the judgement results satisfy the predetermined condition, and judging that the subject is not of living body when the judgement results fail to satisfy the predetermined condition.

A judgement program according to another aspect of the present disclosure causes a computer to function as a judgement device, and causes the computer to function as: a judgement way determination section for selecting two or more living body judgement processes among a plurality of living body judgement processes for judging whether a subject contained in an image is of living body, and determining an order of executing the two or more selected living body judgement processes; an execution section for executing each of the two or more selected living body judgement processes in the determined order; an output section for showing, in each of the two or more selected living body judgement processes, a subject an action required for the living body judgement process; a facial image acquisition section for acquiring a facial image containing a face of the subject when acting in accordance with the shown action, and a first judgement section for judging whether the subject is of living body based on a feature of a section of the face contained in the facial image; and a second judgement section for determining whether judgement results obtained from the two or more selected living body judgement processes satisfy a predetermined condition, judging that the subject is of living body when the judgement results satisfy the predetermined condition, and judging that the subject is not of living body when the judgement results fail to satisfy the predetermined condition.

According to these configurations, the same advantageous effects as the judgement method described above can be obtained.

The present disclosure may be implemented as a judgement system which operates based on such judgement program. It is needless to say that the computer program may be distributed via a computer-readable non-transitory recording medium such as a CD-ROM or a communication network such as Internet.

In addition, each of the embodiments described below shows a specific example of the present disclosure. The numerical values, shapes, constituent elements, steps, order of steps, and the like shown in the following embodiments are merely examples, and are not intended to delimit the present disclosure. Also, among the constituent elements in the following embodiments, constituent elements not recited in the independent claims representing the broadest concepts are described as optional constituent elements. In all the embodiments, the respective contents may also be combined.

Embodiment 1

FIG. 1 is an external view of a living body judgement system 100 according to Embodiment 1 of the present disclosure. The living body judgement system 100 includes a portable terminal device, e.g., a smartphone, and a tablet terminal. However, this is merely an example. The living body judgement system 100 may include a proper combination of a stationary computer or a cloud server, a camera, and a display.

The living body judgement system 100 includes a judgement device 1, an image capturing device 2, and a display 3. The judgement device 1 executes a so-called living body judgement for judging whether a subject U1 contained in an image taken by the image capturing device 2 is of living body.

The image capturing device 2 includes a camera mounted on the portable terminal device. The image capturing device 2 takes a colored visible-light image with a predetermined frame interval.

The display 3 includes a display device, e.g., a liquid crystal display device or an organic EL (Electro Luminescence) display device mounted on the portable terminal device. The display 3 displays a judgement result by the judgement device 1 as to whether the subject U1 contained in an image taken by the image capturing device 2 is of living body.

Figure 2:
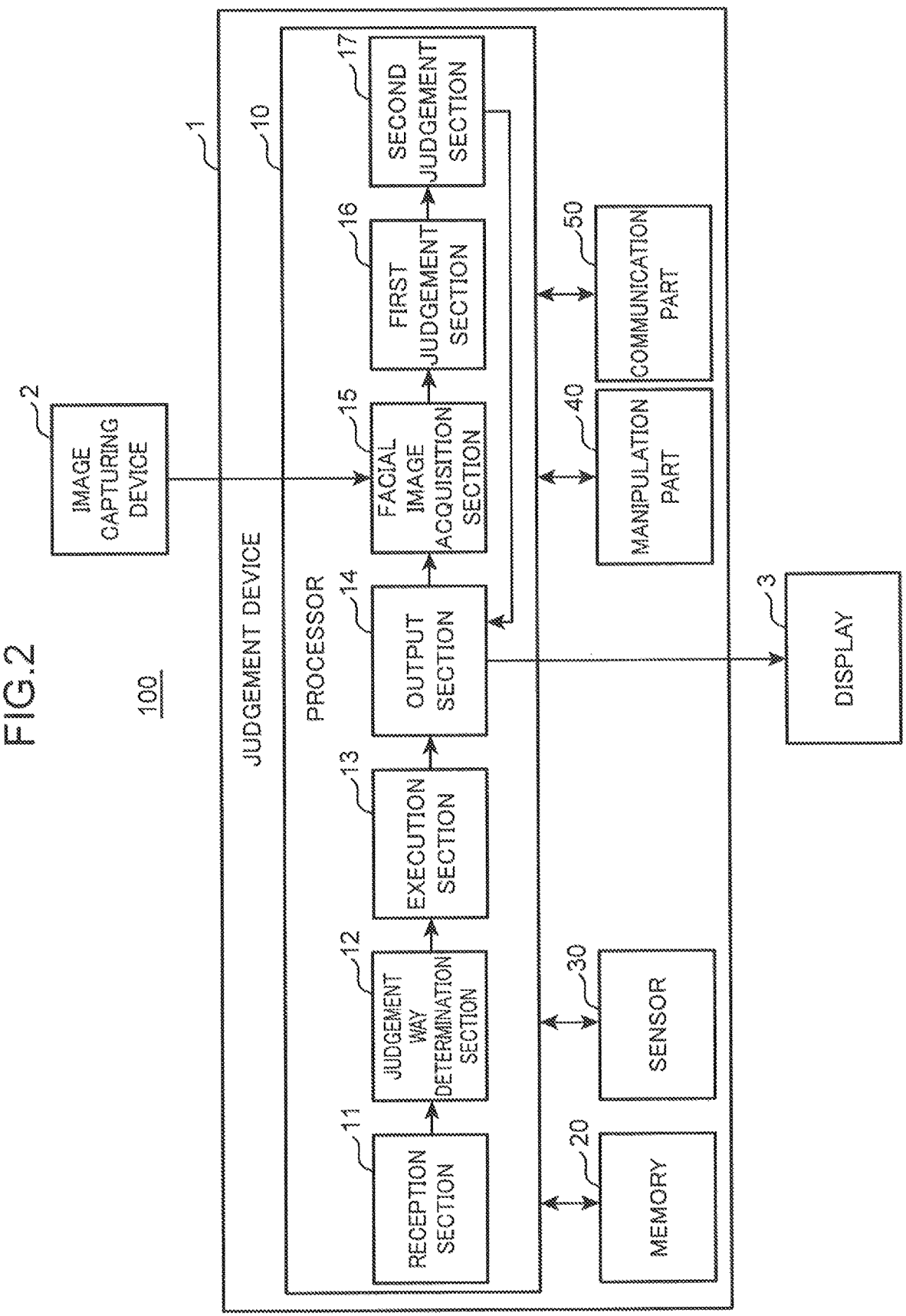
FIG. 2 is a block diagram showing an exemplary general configuration of the living body judgement system according to Embodiment 1 of the present disclosure.

FIG. 2 is a block diagram showing an exemplary general configuration of the living body judgement system 100 according to Embodiment 1 of the present disclosure. The judgement device 1 includes a processor 10 (computer), memory 20, a sensor 30, a manipulation part 40, and a communication part 50. The processor 10 includes, for example, a CPU (Central Processing Unit). The processor 10 includes a reception section 11, a judgement way determination section 12, an execution section 13, an output section 14, a facial image acquisition section 15, a first judgement section 16, and a second judgement section 17. The reception section 11 to the second judgement section 17 are embodied by causing, for example, the processor 10 to execute a living body judgement program (judgement program).

The memory 20 includes non-volatile memory, e.g., ROM (Read Only Memory) and volatile memory, e.g., RAM (Random Access Memory), and stores each kind of information used by the processor 10 for control.

The sensor 30 includes a human sensing sensor, an image sensor, or the like, and detects that a person is present within a predetermined short distance from the sensor 30. The manipulation part 40 includes a touch panel and the like, and is used for each kind of manipulation of the judgement device 1 by the person. The communication part 50 is constructed by a communication circuit adapted to a desired communication system, e.g., Ethernet (trademark), and communicates with an external device.

The reception section 11 receives an input of an instruction to execute a living body judgement. Specifically, the reception section 11 receives an input of an instruction to execute a living body judgement when a detection signal indicating the detection of a subject is input from the sensor 30. Alternatively, the reception section 11 receives an input of an instruction to execute a living body judgement when information indicating the instruction to execute the living body judgement is input as a result of a manipulation of the manipulation section 40 by the person. Alternatively, the reception section 11 receives an input of an instruction to execute a living body judgement when information indicating a request for execution of the living body judgement is input from an external device via the communication part 50, or when information indicating the instruction to execute the living body judgement is input from an application program whose execution is in progress by the processor 10. The input way of an execution instruction of a living body judgement is not limited to this way.

The judgement way determination section 12 selects two or more living body judgement processes among a plurality of living body judgement processes for judging whether a subject contained in an image is of living body, and determines an order of executing the two or more selected living body judgement processes.

Specifically, the judgement way determination section 12 randomly selects two or more living body judgement processes among the plurality of living body judgement processes. The plurality of living body judgement processes includes a living body judgement process based on an orientation of the face, a living body judgement process based on an orientation of an eye, a living body judgement process based on an opening state of an eye, a living body judgement process based on an opening state of a mouth, and a living body judgement process based on a wearing state of glasses. A control program where the plurality of living body judgement processes is implemented is stored in the memory 20.

The plurality of living body judgement processes may include a living body judgement process based on a feature of the other sections of the face. The way of selecting two or more living body judgement processes by the judgement way determination section 12 is not limited to the embodiments described above. For example, the judgement way determination section 12 may regularly select two or more living body judgement processes among a plurality of living body judgement processes, such as selecting a predetermined number of living body judgement processes in the order in which the control programs implementing each of the plurality of living body judgement processes are stored in the memory 20.

The judgement way determination section 12 randomly determines the order of executing the two or more selected living body judgement processes. The judgement way determination section 12 is not limited to the present embodiment, and for example, may regularly determine the order of executing the two or more living body judgement processes, such as determining the order in which respective control programs implementing the two or more living body judgement processes are stored in the memory 20 as the order of executing the two or more living body judgement processes.

The execution section 13 executes each of the two or more living body judgement processes selected by the judgement way determination section 12 in the order determined by the judgement way determination section 12.

The output section 14 shows, in each living body judgement process executed by the execution section 13, a person information indicating an action required for each living body judgement process (hereinafter, "action information"). Specifically, the output section 14 shows the person action information by displaying the action information on the display 3. The output section 14 is not limited to the present embodiment, and may show the person the action information by causing a speaker (not graphically shown) provided on the judgement device 1 to output a voice indicating the action information.

The facial image acquisition section 15 acquires a facial image containing a face of the subject when acting in accordance with the action information shown by the output section 14 in each living body judgement process executed by the execution section 13. Specifically, after the output section 14 has shown the person the action information, the facial image acquisition section 15 causes the image capturing device 2 to start taking an image, and acquires the image containing the face of the subject U1 (FIG. 1) and having been taken by the image capturing device 2 as the facial image. The facial image acquisition section 15 sequentially acquires facial images taken at a predetermined frame rate.

The first judgement section 16 judges whether the subject is of living body based on a feature of a section of the face contained in the facial image acquired by the facial image acquisition section 15. Specifically, the plurality of living body judgement processes includes a living body judgement process having an orientation of the face as the feature of the section of the face, a living body judgement process having an orientation of an eye as the feature of the section of the face, a living body judgement process having an opening state of an eye as the feature of the section of the face, a living body judgement process having an opening state of a mouth as the feature of the section of the face, and a living body judgement process having a wearing state of glasses as the feature of the section of the face. For example, in the living body judgement process having the orientation of the face as the feature of the section of the face, the first judgement section 16 judges whether the subject is of living body based on the orientation of the face contained in the facial image acquired by the facial image acquisition section 15.

The second judgement section 17 determines whether judgement results obtained from the two or more living body judgement processes selected by the judgement way determination section 12 satisfy a predetermined condition. The second judgement section 17 judges that the subject is of living body when the judgement results obtained from the two or more living body judgement processes satisfy the predetermined condition. The second judgement section 17 judges that the subject is not of living body when the judgement results obtained from the two or more living body judgement processes fail to satisfy the predetermined condition.

For example, the second judgement section 17 determines that the judgement results satisfy the predetermined condition when all the judgement results obtained from the two or more selected living body judgement processes indicate that the subject is of living body. Alternatively, the second judgement section 17 may determine that the judgement results satisfy the predetermined condition when a predetermined number or more (for example, more than the half) of the judgement results among the judgement results obtained from the two or more selected living body judgement processes indicate that the subject is of living body.

Figure 3:
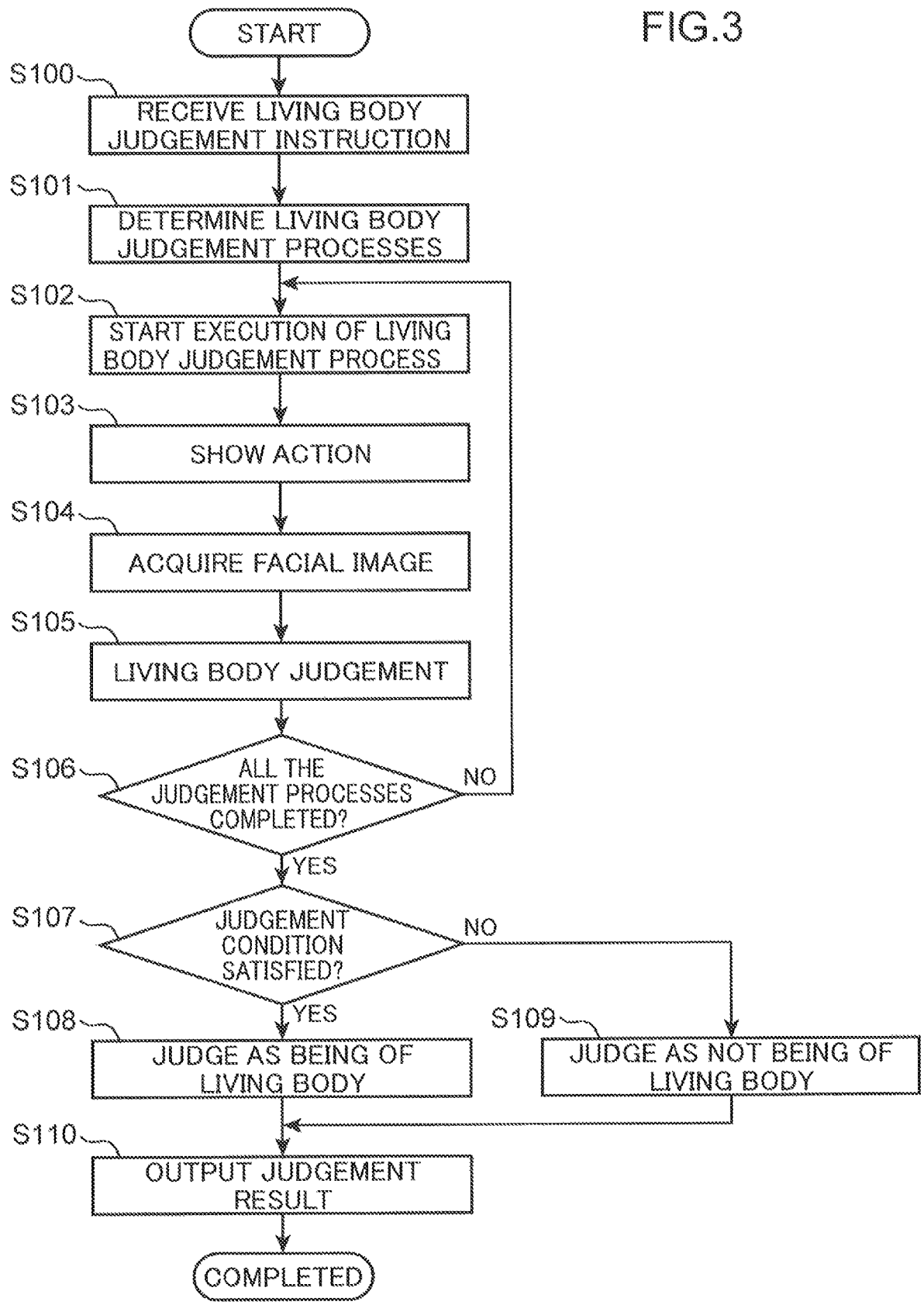
FIG. 3 is a flowchart showing an exemplary process of a judgement device according to Embodiment 1 of the present disclosure.

Subsequently, processes by the judgement device 1 shown in FIG. 2 will be described. FIG. 3 is a flowchart showing an exemplary process by a judgement device 1 according to Embodiment 1 of the present disclosure.

When, in Step S100, the reception section 11 receives an input of an instruction to execute a living body judgement, in Step S101, the judgement way determination section 12 selects two or more living body judgement processes among a plurality of living body judgement processes, and determines an order of executing the two or more selected living body judgement processes.

In Step S102, the execution section 13 sequentially executes the two or more living body judgement processes selected in Step S101 in the determined order. Step S103 through Step S105 are executed in each living body judgement process.

In Step S103, the output section 14 displays the action information indicating an action required for the living body judgement process in progress on the display 3. As a result, the action information is shown to the subject. In Step S104, the facial image acquisition section 15 acquires a facial image containing a face of the subject when acting in accordance with the action information shown in Step S103 from the image capturing device 2. In Step S105, the first judgement section 16 judges whether the subject is of living body based on a feature of a section of the face contained in the facial image acquired by the facial image acquisition section 15 in accordance with the living body judgement process in progress.

In Step S106, the execution section 13 determines whether all the two or more living body judgement processes selected in Step S101 are completed. The processes starting from Step S102 are executed when not all the two or more living body judgement processes selected in Step S101 are determined to be completed in Step S106 (NO in Step S106). As a result, the subsequent living body judgement process is executed. Step S107 is executed when all the two or more living body judgement processes selected in Step S101 are determined to be completed in Step S106 (YES in Step S106).

In Step S107, the second judgement section 17 determines whether judgement results obtained from the two or more living body judgement processes selected in Step S101 satisfy a predetermined condition.

The second judgement section 17 judges that the subject is of living body in Step S108 when determining that the judgement results satisfy the predetermined condition in Step S107 (YES in Step S107). On the other hand, the second judgement section 17 judges that the subject is not of living body in Step S109 when determining that the judgement results fail to satisfy the predetermined condition in Step S107 (NO in Step S107).

After Step S108 and Step S109, the output section 14 outputs, in Step S110, information indicating the judgement result in Step S108 or Step S109.

Specifically, in Step S110, the output section 14 displays, for example, a message indicating the judgement result in Step S108 or Step S109 on the display 3. Further, in this stage, the output section 14 may cause a not-graphically shown speaker to output a voice indicating the judgement result in Step S108 or Step S109.

Here, in a case that an input of an instruction to execute a living body judgement is received as a result of an input of information indicating a request for executing the living body judgement from an external device via the communication part 50 in Step S100, the output section 14 may return information indicating the judgement result in Step S108 or Step S109 to the external device via the communication part 50.

Alternatively, in a case that an input of an instruction to execute a living body judgement is received as a result of an input of information indicating the instruction to execute the living body judgement from an application program whose execution is in progress by the processor 10 in Step S100, the output section 14 may return information indicating the judgement result in Step S108 or Step S109 to the application program whose execution is in progress.

As described above, according to the judgement device 1 in Embodiment 1, the execution patterns of living body judgement processes exponentially increase according to the number, the contents, and the execution order of the living body judgement processes to be executed for judging whether a subject is of living body. This makes it practically impossible for a malicious person to prepare in advance a facial image of a different person which allows the person to be judged as being of living body in all the patterns, and consequently, makes it difficult to commit an identity fraud by use of an image prepared in advance.

Hereinafter, detailed description will be made about each of the plurality of living body judgement processes which could be executed by the execution section 13. In the present embodiment, detailed description will be made about a living body judgement process based on an orientation of the face, a living body judgement process based on an orientation of an eye, a living body judgement process based on an opening state of an eye, a living body judgement process based on an opening state of a mouth, and a living body judgement process based on a wearing state of glasses as the plurality of living body judgement processes.

Living Body Judgement Process Based on Orientation of Face

Figure 4:
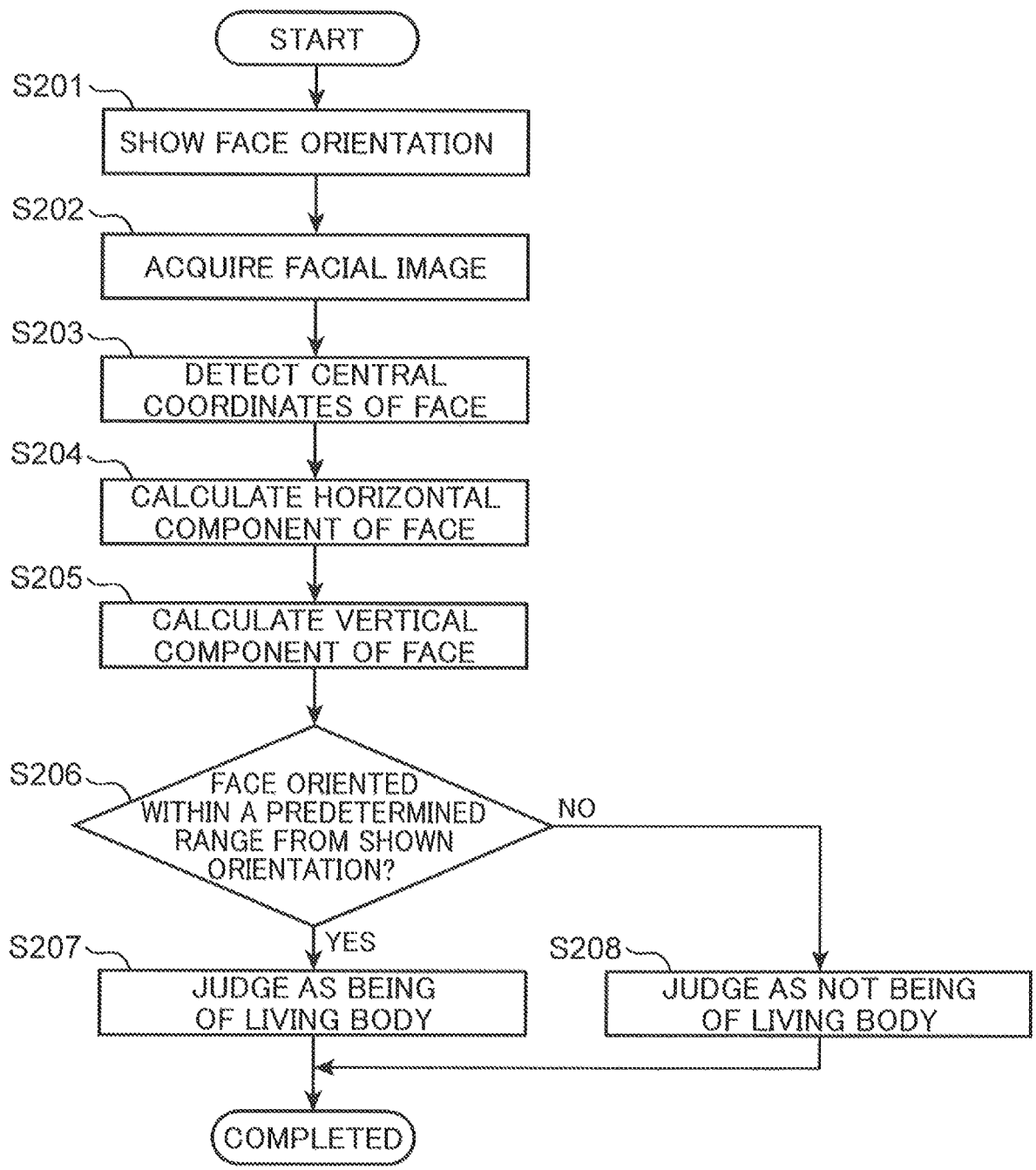
FIG. 4 is a flowchart showing an exemplary living body judgement process based on an orientation of a face.

Hereinafter, detailed description will be made about a living body judgement process based on an orientation of the face. FIG. 4 is a flowchart showing an exemplary living body judgement process based on the orientation of the face. When a living body judgement process based on the face orientation is executed, first, the output section 14 executes Step S201 corresponding to Step S103 shown in FIG. 3. In Step S201, the output section 14 displays on the display 3 action information instructing a face orientation as an action required for the living body judgement process.

Specifically, in Step S201, the output section 14 displays on the display 3 the action information instructing the person to orient his/her face in one of the directions among upward, downward, leftward, and rightward directions. The output section 14 randomly determines one of the directions among upward, downward, leftward, and rightward directions to be instructed in the action information. However, the output section 14 is not limited to the present configuration, and may regularly determine one of the directions among upward, downward, leftward, and rightward directions to be instructed in the action information in accordance with a predetermined rule, such as determining the directions to be upward, downward, leftward, and rightward directions in this order.

Subsequently, the facial image acquisition section 15 executes Step S202 corresponding to Step S104 shown in FIG. 3. In Step S202, the facial image acquisition section 15 acquires a facial image containing a face of the subject from the image capturing device 2.

Thereafter, the first judgement section 16 executes the processings starting from Step S203 corresponding to Step S105 shown in FIG. 3.

In Step S203, the first judgement section 16 detects central coordinates of the face from the facial image acquired in Step S202.

Specifically, in Step S203, the first judgement section 16 first detects a face region representing the face of the subject from the facial image. The face region is a rectangular region having such a size as to include, for example, the entire face. Specifically, the first judgement section 16 detects the face region by inputting the facial image into a classifier prepared in advance for detecting the face region. This classifier includes, for example, a Haar cascade classifier.

Subsequently, the first judgement section 16 detects a characteristic point of the face from the detected face region. The characteristic point of the face includes one or a plurality of points situated at a characteristic position in each of the plurality of sections constituting the face, e.g., an outer corner of an eye, an inner corner of an eye, a contour of the face, a nasal ridge, a lip, and an eyebrow. The characteristic point is also referred to as "landmark". The first judgement section 16 detects the characteristic point of the face from the face region by executing a landmark detection processing by use of a model file of a machine learning framework, for example.

Figure 8:
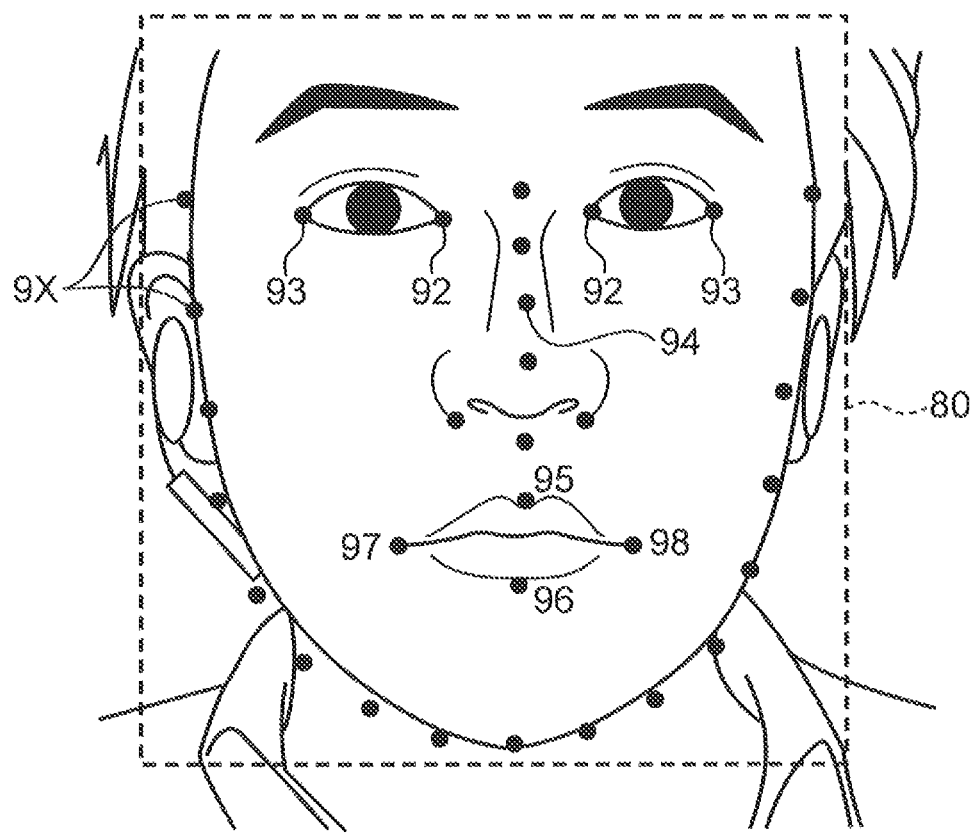
FIG. 8 is a diagram showing characteristic points of a face.

FIG. 8 is a diagram showing characteristic points 9X of the face. For example, as shown in FIG. 8, a landmark detection processing is applied to the face region 80 to thereby detect a plurality of characteristic points 9X. In an example shown in FIG. 8, five exemplary characteristic points 9X situated on the nasal ridge, two exemplary characteristic points 9X situated on a lower side of the nose, seventeen exemplary characteristic points 9X situated along the contour of the face, and four exemplary characteristic points 95 to 98 situated at upper, lower, left, and right ends of the lips are detected among the characteristic points 9X detected by the landmark detection processing. Further, in the example shown in FIG. 8, two characteristic points 9X situated at inner corners 92 of the left and right eyes, and two characteristic points 9X situated at outer corners 93 of the left and right eyes are detected.

The characteristic points 9X are allotted with landmark point numbers, respectively. The correspondence between the landmark point numbers of the characteristic points and the sections of the face is determined in advance. Each characteristic point 9X is allotted with a landmark point number in such a manner that, for example, the characteristic point 9X having the landmark number "2" indicates the outer corner 93 of the left eye, and the characteristic point having the landmark number "0" indicates the inner corner 92 of the left eye. Thus, the first judgement section 16 can identify the section of the face indicated by the characteristic point 9X based on the landmark point number thereof.

Subsequently, the first judgement section 16 detects, among the characteristic points 9X of the face detected from the face region 80, coordinates of the characteristic point 9X which is at the center in the vertical direction of the plurality of characteristic points 9X indicating the nasal ridge as the central coordinates of the face. In the example shown in FIG. 8, the first judgement section 16 detects the coordinates of the third highest characteristic point 94 among five characteristic points 9X indicating the nasal ridge as the central coordinates of the face. The configuration is not limited to this embodiment. The first judgement section 16 may detect the coordinates of the characteristic point 9X at an upper end or a lower end of the nasal ridge as the central coordinates of the face as well.

Subsequently, in Step S204, the first judgement section 16 calculates a horizontal component of the face orientation. Hereinafter, contents of Step S204 will be specifically described with reference to FIG. 8.

The first judgement section 16 sets a vertical central line in a vertical direction and a horizontal central line in a horizontal direction based on the characteristic point 9X of the face detected from the face region 80. For example, the first judgement section 16 sets a straight line which passes through a characteristic point 94 indicating the center of the face having been detected in Step S203 and is parallel to a vertical side of the face region 80 as a vertical central line. Further, the first judgement section 16 sets a straight line which passes through the characteristic point 94 and is parallel to a horizontal side of the face region 80 as a horizontal central line.

Subsequently, the first judgement section 16 divides the horizontal central line at the characteristic point 94, finds respective lengths of the right segment and the left segment, and finds respective percentages of the right segment and the left segment where the length of the horizontal central line is 100%. The first judgement section 16 calculates the horizontal component of the face orientation based on the percentages. For example, when the percentage of the right segment is α1, the percentage of the left segment is α2, and the right side is the positive side, in the face oriented toward the left, the percentage α2 is lower than the percentage α1.

In the face oriented toward the right, the percentage α1 is lower than the percentage α2. In the face oriented frontally, the percentage α2 is substantially equal to the percentage α1. Substantially equal means to allow a slight difference between the percentage α2 and the percentage α1.

Thereafter, the first judgement section 16 subtracts the lower percentage of the percentage α1 and the percentage α2 from 50. For example, when the percentage α2 is lower than the percentage α1, the first judgement section 16 calculates "50-α2". When the percentage α1 is lower than the percentage α2, the first judgement section 16 calculates "50-α1". Subsequently, when the face is oriented toward the right, since the right side is the positive side, the first judgement section 16 calculates "50-α1" to obtain the horizontal component of the face orientation. On the other hand, when the face is oriented toward the left, since the left side is the negative side, the first judgement section 16 calculates "−(50-α2)" to obtain the horizontal component of the face orientation.

Thus, an increase in the value of the horizontal component of the face orientation toward the positive direction indicates that the face is turned more toward the right, and an increase in a value of the horizontal component of the face orientation toward the negative direction indicates that the face is turned more toward the left. Zero in the horizontal component of the face orientation indicates that the face is oriented frontally.

Subsequently, in Step S205, the first judgement section 16 calculates a vertical component of the face orientation. Hereinafter, contents of Step S205 will be specifically described with reference to FIG. 8.

The first judgement section 16 sets, in the face region 80, a horizontal central line being a straight line which passes through the characteristic point 94 indicating the center of the face and is parallel to a horizontal side of the face region 80. The horizontal central line may be set at a characteristic point 9X other than the characteristic point 94 on the nasal ridge. The setting result of the horizontal central line in Step S204 may be applied to the setting of this horizontal central line.

Subsequently, the first judgement section 16 divides the vertical side of the face region 80 at a point of intersection between the vertical side and the horizontal central line, and finds respective lengths of the upper segment and the lower segment. Thereafter, the first judgement section 16 finds respective percentages of the upper segment and the lower segment where the length of the vertical side is 100%, and finds a vertical component of the face orientation based on the percentages. For example, when the percentage of the upper segment is α3, the percentage of the lower segment is α4, and the upper side is the positive side, in the face oriented upwardly, the percentage α3 is lower than the percentage α4. In the face oriented downwardly, the percentage α4 is lower than the percentage α3. In the face oriented frontally, the percentage α3 is substantially equal to the percentage α4. The percentage α3 being substantially equal to the percentage α4 means that the percentage α1 and the percentage α2 described above are substantially equal.

Thereafter, the first judgement section 16 subtracts the lower percentage of the percentage α3 and the percentage α4 from 50. For example, when the percentage α3 is lower than the percentage α4, the first judgement section 16 calculates "50-α3". When the percentage α4 is lower than the percentage α3, the first judgement section 16 calculates "50-α4". Subsequently, when the face is oriented upwardly, since the upper side is the positive side, the first judgement section 16 calculates "50-α3" to obtain the vertical component of the face orientation. On the other hand, when the face is looking down, since the upper side is the positive side, the first judgement section 16 calculates "–(50-α4)" to obtain the vertical component of the face orientation.

Thus, an increase in the value of the vertical component of the face orientation toward the positive direction indicates that the face is turned more upwardly, and an increase in a value of the vertical component of the face orientation toward the negative direction indicates that the face is turned more downwardly. Zero in the vertical component of the face orientation indicates that the face is oriented frontally.

Subsequently, in Step S206, the first judgement section 16 determines whether the face orientation expressed by the horizontal component and the vertical component of the face orientation calculated in Step 204 and Step 205 is within a predetermined range from the face orientation indicated by the action information shown in Step S201.

For example, when action information instructing the person to orient his/her face toward the right is displayed on the display 3 in Step S201, and a value of the horizontal component of the face orientation calculated in Step S204 is within a predetermined range of positive values (from +Z1 to +Z2 (Z2>Z1)), the first judgement section 16 determines that the face orientation is within the predetermined range from a face orientation indicated by the action information shown in Step S201.

When action information instructing the person to orient his/her face toward the left is displayed on the display 3 in Step S201, and a value of the horizontal component of the face orientation calculated in Step S204 is within a predetermined range of negative values (from –Z1 to –Z2 (Z2>Z1)), the first judgement section 16 determines that the face orientation is within the predetermined range from a face orientation indicated by the action information shown in Step S201.

When action information instructing the person to orient his/her face frontally is displayed on the display 3 in Step S201, and a value of the horizontal component of the face orientation calculated in Step S204 is within predetermined positive and negative ranges (–Z3 to +Z4 (Z3, Z4>0)) setting zero at a reference, the first judgement section 16 determines that the face orientation is within the predetermined range from a face orientation indicated by the action information shown in Step S201.

Similarly, when action information instructing the person to orient his/her face upwardly is displayed on the display 3 in Step S201, and a value of the vertical component of the face orientation calculated in Step S205 is within a predetermined range of positive values (from +Z5 to +Z6 (Z6>Z5)), the first judgement section 16 determines that the face orientation is within the predetermined range from a face orientation indicated by the action information shown in Step S201.

When action information instructing the person to orient his/her face downwardly is displayed on the display 3 in Step S201, and a value of the vertical component of the face orientation calculated in Step S205 is within a predetermined range of negative values (from –Z5 to –Z6 (Z6>Z5)), the first judgement section 16 determines that the face orientation is within the predetermined range from a face orientation indicated by the action information shown in Step S201.

When action information instructing the person to orient his/her face frontally is displayed on the display 3 in Step S201, and a value of the vertical component of the face orientation calculated in Step S205 is within predetermined positive and negative ranges (–Z7 to +Z8 (Z7, Z8>0)) setting zero at a reference, the first judgement section 16 determines that the face orientation is within the predetermined range from a face orientation indicated by the action information shown in Step S201.

The way of calculating the horizontal component of the face orientation by the first judgement section 16 in Step S204 is not limited to the above-mentioned way. For example, a value obtained by subtracting 50 from a greater value of the percentage α1 and the percentage α2 may be used as the horizontal component of the face orientation. The horizontal component of the face orientation may have the left side as the positive side. The way of calculating the vertical component of the face orientation by the first judgement section 16 in Step S205 is not limited to the above-mentioned way. For example, a value obtained by subtracting 50 from a higher percentage of the percentage 3 and the percentage α4 may be used as the vertical component of the face orientation. The vertical component of the face orientation may have the lower side as the positive side. In Step S206, the way of determining whether the face orientation is within the predetermined range from a face orientation indicated by the action information shown in Step S201 based on the values of horizontal component and the vertical component of the face orientation calculated in Step S204 and Step S205 may be modified so as to be consistent with the modifications described above.

When, in Step S206, the first judgement section 16 determines that the face orientation is within the predetermined range from a face orientation indicated by the action information shown in Step S201 (YES in Step S206), in Step S207, the first judgement section 16 judges that the subject is of living body, outputs information indicating the judgement result to the second judgement section 17, and finishes the living body judgement process based on the face orientation.

On the other hand, when, in Step S206, the first judgement section 16 determines that the face orientation fails to be within the predetermined range from a face orientation indicated by the action information shown in Step S201 (NO in Step S206), in Step S208, the first judgement section 16 judges that the subject is not of living body, outputs information indicating the judgement result to the second judgement section 17, and finishes the living body judgement process based on the orientation of the face.

Living Body Judgement Process Based on Orientation of Eye

Figure 5:
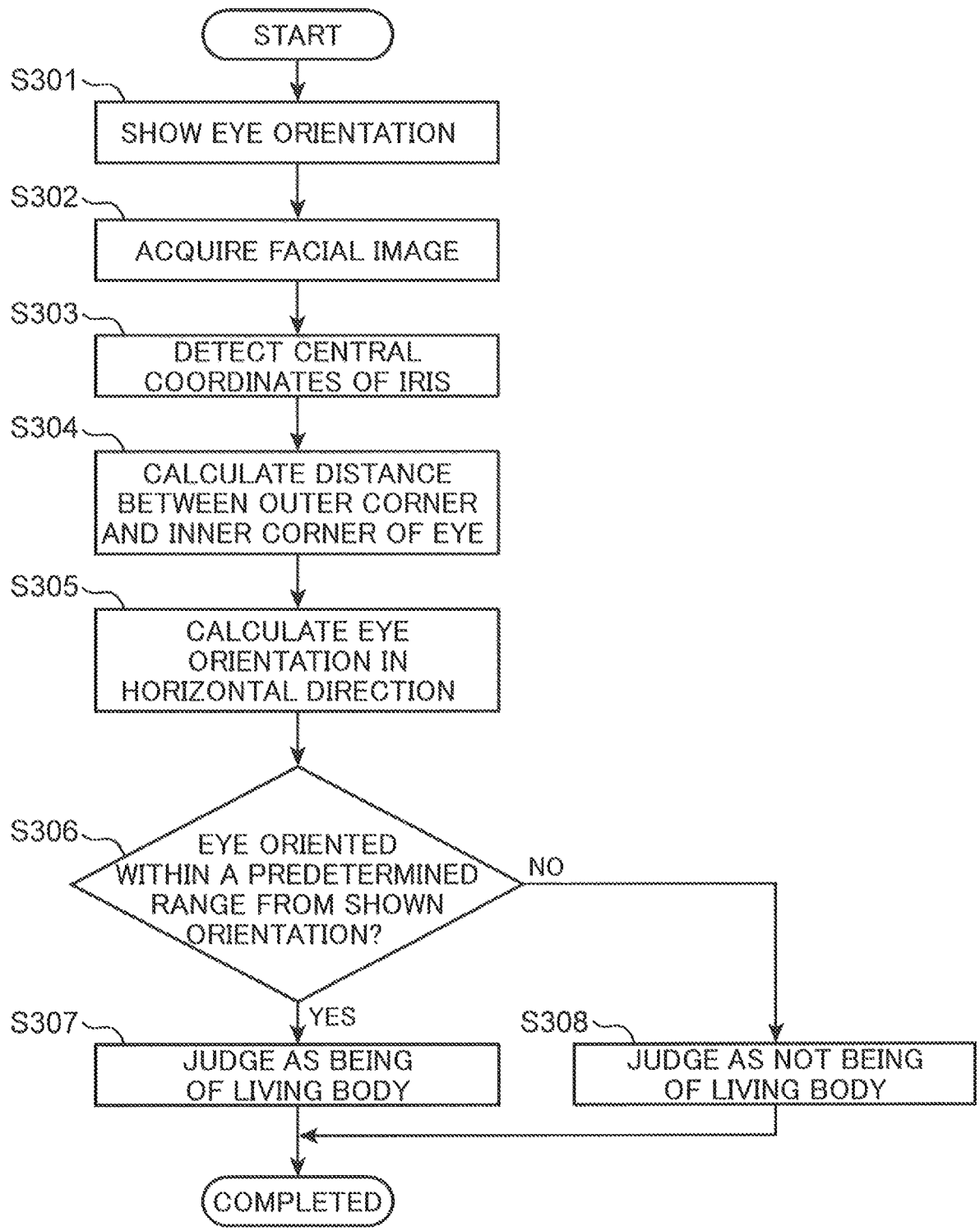
FIG. 5 is a flowchart showing an exemplary living body judgement process based on an orientation of an eye.

Hereinafter, detailed description will be made about a living body judgement process based on an orientation of an eye. FIG. 5 is a flowchart showing an exemplary living body judgement process based on an orientation of an eye. When a living body judgement process based on the eye orientation is executed, first, the output section 14 executes Step S301 corresponding to Step S103 shown in FIG. 3. In Step S301, the output section 14 displays on the display 3 action information instructing an eye orientation as an action required for the living body judgement process.

Specifically, in Step S301, the output section 14 displays on the display 3 action information instructing the person to orient his/her eye to either the left or the right while maintaining the face frontally. The output section 14 randomly determines either the left or the right which is to be instructed in the action information. However, the output section 14 is not limited to the present configuration, and may regularly determine either the left or the right to be instructed in the action information in accordance with a predetermined rule, such as determining the directions to be the left and the right in this order.

Thereafter, the facial image acquisition section 15 executes Step S302 corresponding to Step S104 shown in FIG. 3. In Step S302, the facial image acquisition section 15 acquires a facial image containing a face of the subject from the image capturing device 2.

Subsequently, the first judgement section 16 executes the processings starting from Step S303 corresponding to Step S105 shown in FIG. 3.

In Step S303, the first judgement section 16 detects central coordinates of the iris from the facial image acquired in Step S302.

Specifically, in Step S303, the first judgement section 16 detects the face region 80 by inputting the facial image into the classifier for detecting the face region in the same manner as in Step S203 (FIG. 4). The first judgement section 16 detects an eye section by inputting the detected face region 80 into a classifier for detecting the eye section. The eye section is a rectangular section including the entire eye section having a dimension of the eye added with a slight margin.

Thereafter, the first judgement section 16 converts the detected eye section to a grayscale image. A processing of calculating an average gradation value of each of red component, green component, and blue component in each pixel constituting the eye section can be used as a processing of conversion to a grayscale image. However, this is merely an example. Other processings may be used as the processing of conversion to a grayscale image.

Subsequently, the first judgement section 16 executes a processing of binarization on the eye section of the grayscale image, and generates a binary image of the eye section. The first judgement section 16 divides the generated binary image of the eye section into a plurality of local regions by separating the binary image by a predetermined number of pixels in an X direction. The X direction indicates a horizontal direction (lateral direction) of the image taken by the image capturing device 2. For example, the first judgement section 16 equally divides the binary image into ten in the horizontal direction. As a result, the binary image is divided into ten strip-shaped local regions having a Y direction as the longitudinal direction. Here, the first judgement section 16 divides the binary image into ten local regions. However, this is merely an example. The binary image may be divided into the number of local regions represented by an integer of 2 or greater and 9 or smaller or an integer of 11 or greater as well. The Y direction indicates a vertical (perpendicular) direction of the image taken by the image capturing device 2.

Thereafter, the first judgement section 16 calculates an average luminance value of each of the ten local regions.

Subsequently, the first judgement section 16 calculates the X coordinate of an estimated iris center position. The estimated iris center position is an estimated position of the iris center position, which is different from a finally-calculated iris center position. A double eyelid, density of eyelashes, false eyelashes, and the like may affect the image, causing the relevant portions to appear as a large white area. In this case, the white part of the eye is liable to be filled with the white area. The estimated iris center position is calculated in order to avoid such situation.

The first judgement section 16 calculates a coordinate of a middle point in the X direction of the local region having the highest average luminance value among a plurality of local regions as the X coordinate of the estimated iris center position. However, depending on the width of the local region in the X direction, a middle point of the local region in the X direction may be inappropriate as the X coordinate of the estimated iris center position. In this case, a left end or a right end of the local region in the X direction may be calculated as the X coordinate of the estimated iris center position.

Subsequently, the first judgement section 16 calculates a Y coordinate of the estimated iris center position. The first judgement section 16 detects an uppermost white pixel point and a lowermost white pixel point from the local region including the X coordinate of the estimated iris center position, and calculates a middle point between the uppermost point and the lowermost point as the Y coordinate of the estimated iris center position.

An eyelid or a makeup may affect the image, causing the uppermost point and the lowermost point to appear in an adjoining local region on the left side or an adjoining local region on the right side. Therefore, the first judgement section 16 may calculate an uppermost point and a lowermost point in the local region including the X coordinate of the estimated iris center position, and the two local regions adjoining the relevant local region on the left side and the right side, obtain an average uppermost point by averaging the three calculated uppermost points and an average lowermost point by averaging the three calculated lowermost points, and thus calculate a middle point between the average uppermost point and the average lowermost point as the Y coordinate of the estimated iris center position.

Thereafter, the first judgement section 16 executes filling processing on the binary image. In a visible-light image, an external light or a background may be reflected on the cornea depending on the brightness of the surroundings and the like. When the reflection is large, a bright-colored area such as a white area is likely to appear in a colored part of the eye which is black or brown. In this case, when an eye image is binarized, a black island-like area appears in the colored part of an eye, which impedes the detection of iris information at a high accuracy. Accordingly, the first judgement section 16 executes filing processing of filling in the black island-like area.

Details of the filling processing are described below. First, the first judgement section 16 sets a vertical line parallel to the Y direction on the X coordinate of the estimated iris center position in the binary image. Thereafter, the first judgement section 16 detects the first white pixel which appears from an upper end side of the binary image on the vertical line as an uppermost pixel.

Subsequently, the first judgement section 16 detects the first white pixel which appears from a lower end of the binary image on the vertical line as a lowermost pixel. Thereafter, the first judgement section 16 determines whether a distance between the uppermost pixel and the lowermost pixel is longer than a first reference distance. Subsequently, when determining that the distance between the uppermost pixel and the lowermost pixel is longer than the first reference distance, the first judgement section 16 judges a black pixel situated between the uppermost pixel and the lowermost pixel on the vertical line as a black pixel satisfying a predetermined condition, and replaces the black pixel with a white pixel.

On the other hand, when determining that the distance between the uppermost pixel and the lowermost pixel is equal to or shorter than the first reference distance, the first judgement section 16 does not execute the replacement on the vertical line. For example, a proper distance having an assumed iris diameter as a reference is adopted as the first reference distance.

The first judgement section 16 executes the filling processing on each vertical line arranged within a range of a left reference distance from the estimated iris center position in an X leftward direction, and on each vertical line arranged within a range of a right reference distance from the estimated iris center position in an X rightward direction. An example of a second reference distance is a sum of the left reference distance range and the right reference distance range. For example, the left reference distance range and the right reference distance range cover the same range. For example, a distance slightly longer than the assumed iris diameter is adopted as the second reference range. As a result, the filling processing can be concentratedly applied to the vertical lines falling within the colored part of an eye.

Subsequently, the first judgement section 16 detects a leftmost pixel and a rightmost pixel of the colored part of an eye, respectively. The first judgement section 16 measures a luminance variation in each pixel in the white area of the binary image one by one, by starting from the estimated iris center position and proceeding to each pixel in the X leftward and rightward directions. Thereafter, the first judgement section 16 detects the first black pixel which appears in the X leftward direction as a leftmost pixel, and detects the first black pixel which appears in the X rightward direction as a rightmost pixel.

Thereafter, the first judgement section 16 calculates a middle position between the leftmost pixel and the rightmost pixel as the X coordinate of the iris center position.

Subsequently, the first judgement section 16 detects an uppermost pixel and a lowermost pixel of the colored part of an eye, respectively. The first judgement section 16 measures a luminance variation in each pixel in the white area of the binary image one by one, by starting from the X coordinate of the iris center position and proceeding to each pixel in Y upward and downward directions. Thereafter, the first judgement section 16 detects the first black pixel which appears in the Y upward direction as an uppermost pixel, and detects the first black pixel which appears in the Y downward direction as a lowermost pixel.

Subsequently, the first judgement section 16 calculates a middle position between the uppermost pixel and the lowermost pixel as the Y coordinate of the iris center position. The central coordinates of the iris are calculated according to the flow described above.

In Step S304, the first judgement section 16 detects positions of an outer corner and an inner corner of an eye from the binary image of the eye section generated in Step S303, and calculates a distance from the central coordinates of the iris detected in Step S303 to the outer corner of an eye in the horizontal direction and a distance from the central coordinates of the iris to the inner corner of an eye in the horizontal direction.

Specifically, the binary image of the eye section includes a frame which is a circumscribed rectangle of the white area. Therefore, the first judgement section 16 calculates, in the binary image, a leftmost X coordinate of the white area as the leftmost X coordinate of the binary image, i.e., as the X coordinate of the position of the outer corner of the left eye or the inner corner of the right eye. Further, the first judgement section 16 calculates a rightmost X coordinate of the white area as the rightmost X coordinate of the binary image, i.e., as the X coordinate of the position of the inner corner of the left eye or the outer corner of the right eye.

Thereafter, the first judgement section 16 calculates an absolute value of a difference between the X coordinate of the central coordinates of the iris detected in Step S303 and the X coordinate of the outer corner of an eye as a distance from the central coordinates of the iris to the position of the outer corner of an eye in the horizontal direction. Further, the first judgement section 16 calculates an absolute value of a difference between the X coordinate of the central coordinates of the iris detected in Step S303 and the X coordinate of the inner corner of an eye as a distance from the central coordinates of the iris to the position of the inner corner of an eye in the horizontal direction. These processings are executed on the binary images corresponding to the left eye and the right eye, respectively.

In Step S305, the first judgement section 16 calculates an eye orientation in the horizontal direction. Specifically, the first judgement section 16 calculates a percentage $\beta 1$ of a first distance D1 and a percentage $\beta 2$ of a second distance D2 where the first distance D1 is the distance between the inner corner of an eye and the central coordinates of the iris in the horizontal direction, the second distance D2 is the distance between the outer corner of an eye and the central coordinates of the iris in the horizontal direction, the first distance D1 and the second distance D2 having been calculated in Step S304, and the distance between the X coordinate of the inner corner of an eye and the X coordinate of the outer corner of an eye is 100%. These processings are executed on the binary images corresponding to the left eye and the right eye, respectively.

When the eyes are oriented toward the left, the left eye and the right eye are turned leftward, where the second distance D2 is shorter in the left eye, and the first distance D1 is shorter in the right eye. When the eyes are oriented toward the right, the left eye and the right eye are turned rightward, where the second distance D2 is longer in the left eye, and the first distance D1 is longer in the right eye.

In view of the above, here, the eye turned rightward is considered to be turned to the positive side. The first judgement section 16 focuses on the right eye, for example, and judges that the eye is turned leftward when the percentage $\beta 1$ is lower than the percentage $\beta 2$, and judges that the eye is turned rightward when the percentage $\beta 2$ is lower than the percentage $\beta 1$. The first judgement section 16, focusing on the left eye, judges that the eye is turned leftward when the percentage $\beta 2$ is lower than the percentage $\beta 1$, and judges that the eye is turned rightward when the percentage $\beta 1$ is lower than the percentage $\beta 2$.

When judging that the eye is turned leftward, the first judgement section 16 calculates an average value of the percentage $\beta 2$ of the second distance D2 of the left eye and the percentage $\beta 1$ of the first distance D1 of the right eye, and calculates a value obtained by subtracting the average value from 50 and multiplied by a negative sign as an orientation of the eye in the horizontal direction. The average value is calculated because there is no great difference in the orientation of an eye between the left eye and the right eye. The average value is subtracted from 50 so that the orientation value of an eye in the horizontal direction increases as the eye is turned more from a frontal direction of the face toward the left or the right. The obtained value is multiplied by the negative sign so that the right side is the positive side.

When judging that the eye is turned rightward, the first judgement section 16 calculates an average value of the percentage $\beta 1$ of the first distance D1 of the left eye and the percentage $\beta 2$ of the second distance D2 of the right eye, and calculates a value obtained by subtracting the average value from 50 as an eye orientation in the horizontal direction.

Specifically, an increase in the eye orientation value in the horizontal direction toward the positive direction indicates that the eye is turned more toward the right with respect to the frontal direction of the face, and an increase in the eye orientation value in the horizontal direction toward the negative direction indicates that the eye is turned more toward the left with respect to the frontal direction of the face. Zero in the eye orientation value in the horizontal direction indicates that the eye is oriented in the front direction of the face. The eye orientation value in the horizontal direction is calculated according to the flow described above.

Subsequently, in Step S306, the first judgement section 16 determines whether the eye orientation in the horizontal direction calculated in Step 305 is within a predetermined range from an eye orientation indicated by the action information shown in Step S301.

For example, when action information instructing the person to orient his/her eye toward the right is displayed on the display 3 in Step S301, and an eye orientation value in the horizontal direction calculated in Step S305 is within a predetermined range of positive values (from +Z1 to +Z2 (Z2>Z1)), the first judgement section 16 determines that the eye orientation is within the predetermined range from an eye orientation indicated by the action information shown in Step S301.

When action information instructing the person to orient his/her eye toward the left is displayed on the display 3 in Step S301, and an eye orientation value in the horizontal direction calculated in Step S305 is within a predetermined range of negative values (from −Z1 to −Z2 (Z2>Z1)), the first judgement section 16 determines that the eye orientation is within the predetermined range from an eye orientation indicated by the action information shown in Step S301.

When action information instructing the person to orient his/her eye frontally is displayed on the display 3 in Step S301, and an eye orientation value in the horizontal direction calculated in Step S305 is within predetermined positive and negative ranges (from −Z3 to +Z4 (Z3, Z4>0)) setting zero at a reference, the first judgement section 16 determines that the eye orientation is within the predetermined range from an eye orientation indicated by the action information shown in Step S301.

In the eye orientation in the horizontal direction, the left side may be defined as the positive side. The way of calculating the orientation of the horizontal direction of the eye by the first judgement section 16 in Step S305 is not limited to the above-mentioned way. In Step S306, the way of determining whether the eye orientation falls within a predetermined range from an eye orientation indicated by the action information shown in Step S301 based on the eye orientation in the horizontal direction calculated in Step S305 is changed in accordance with the above-mentioned change.

When, in Step S306, the first judgement section 16 determines that the eye orientation in the horizontal direction falls within the predetermined range from an eye orientation indicated by the action information shown in Step S301 (YES in Step S306), in Step S307, the first judgement section 16 judges that the subject is of living body, outputs information indicating the judgement result to the second judgement section 17, and finishes the living body judgement process based on the eye orientation.

On the other hand, when, in Step S306, the first judgement section 16 determines that the eye orientation in the horizontal direction fails to fall within the predetermined range from an eye orientation indicated by the action information shown in Step S301 (NO in Step S306), in Step S308, the first judgement section 16 judges that the subject is not of living body, outputs information indicating the judgement result to the second judgement section 17, and finishes the living body judgement process based on the eye orientation.

Living Body Judgement Process Based on Opening State of Eye

Figure 6:
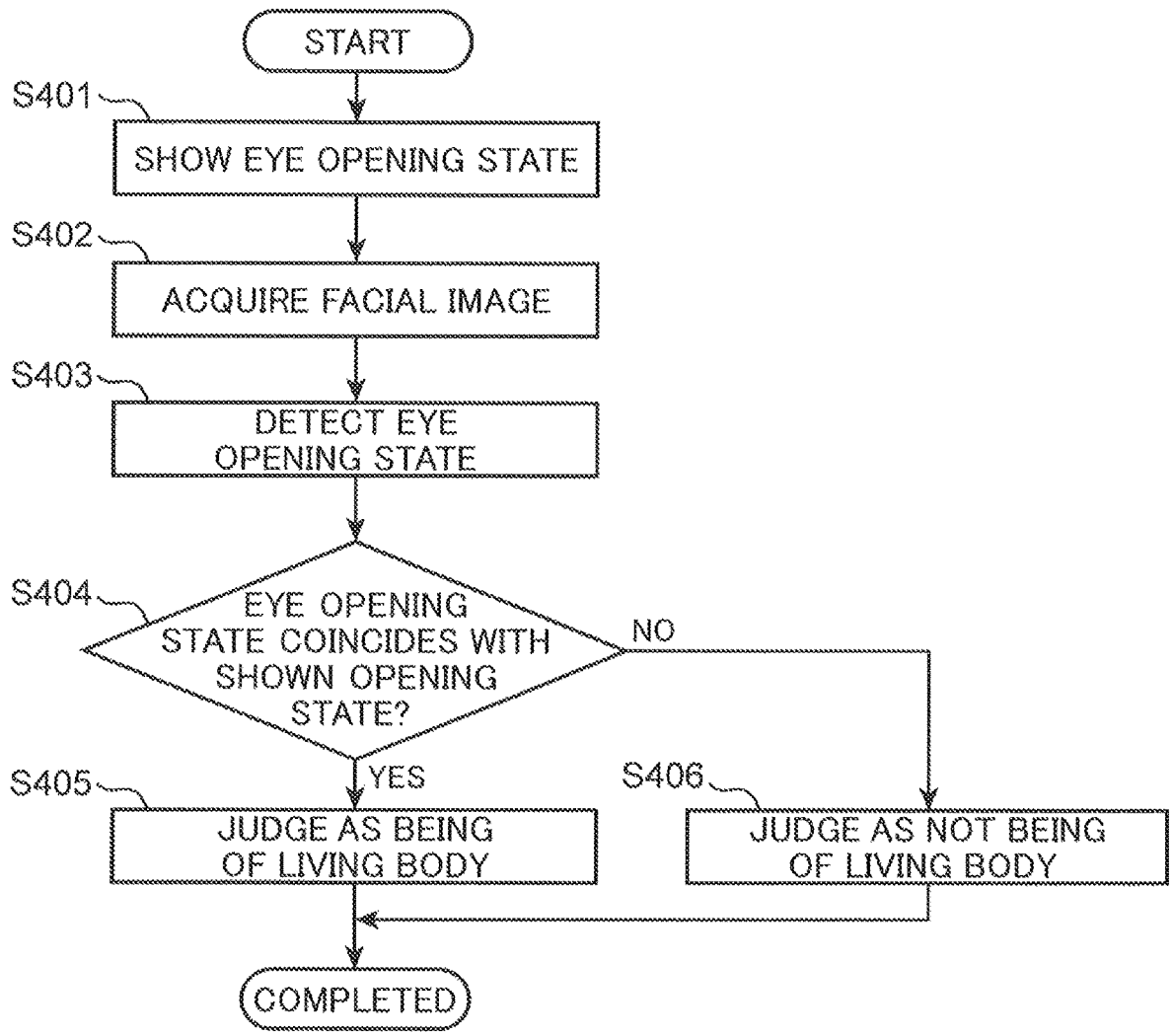
FIG. 6 is a flowchart showing an exemplary living body judgement process based on an opening state of an eye.

Hereinafter, the living body judgement process based on an opening state of an eye will be described in detail. FIG. 6 is a flowchart showing an exemplary living body judgement process based on an opening state of an eye. When a living body judgement process based on an eye opening state is executed, first, the output section 14 executes Step S401 corresponding to Step S103 shown in FIG. 3. In Step S401, the output section 14 displays on the display 3 action information instructing a person to open and close an eye as an action required for the living body judgement process.

Specifically, in Step S401, the output section 14 displays on the display 3 action information instructing the person to open both eyes, action information instructing the person to close both eyes, or action information instructing the person to blink both eyes a predetermined number of times. Alternatively, in Step S401, the output section 14 displays on the display 3 action information instructing the person to open one and close the other of the right and left eyes, action information instructing the person to blink only one of the right and left eyes a predetermined number of times.

The output section 14 randomly determines a way of opening and closing an eye to be instructed in the action information. However, the output section 14 is not limited to the present configuration, and may regularly determine the way of opening and closing an eye to be instructed in the action information in accordance with a predetermined rule, such as determining in the order described above, for example.

Subsequently, the facial image acquisition section 15 executes Step S402 corresponding to Step S104 shown in FIG. 3. In Step S402, the facial image acquisition section 15 acquires a facial image containing a face of the subject from the image capturing device 2.

Thereafter, the first judgement section 16 executes the processings starting from Step S403 corresponding to Step S105 shown in FIG. 3.

In Step S403, the first judgement section 16 detects an eye opening state from the facial image acquired in Step S402.

Specifically, in Step S403, the first judgement section 16 first detects a face region 80 from the facial image acquired in Step S402 in the same manner as in Step S303 shown in FIG. 5, and detects an eye section from the face region 80. Thereafter, the first judgement section 16 converts the detected eye section to a grayscale image, executes a processing of binarization on the eye section of the grayscale image, and generates a binary image of the eye section.

As a result, when an eye is open, a binary image is generated where pixels corresponding to dark positions including the colored part of an eye, eyelashes, and a part of the white part of an eye are represented by white pixels, and pixels corresponding to bright positions including the other area of the white part of an eye and the skin are represented by black pixels in the eye section. On the other hand, when the eye is closed, a binary image is generated where pixels corresponding to the dark positions including the eyelashes and an edge of an upper eyelid are represented by the white pixels, and pixels corresponding to the bright positions including the skin are represented by the black pixels in the eye section.

Subsequently, the first judgement section 16 calculates a maximum height where a mass of white area constituted by the white pixels has a maximum vertical distance between an uppermost pixel and a lowermost pixel. The first judgement section 16 calculates a height at each X coordinate of the white area by counting the number of white pixels at each X coordinate on the X axis in the white area of the binary image. The height is represented by the number of white pixels in the vertical direction.

The first judgement section 16 calculates a height at each X coordinate by starting from a leftmost pixel of the white area and sequentially proceeding one by one to a rightmost pixel. The first judgement section 16 finds an X coordinate where the white area has the maximum height, and calculates the height at the relevant X coordinate. These processings are executed on the binary images corresponding to the left and right eyes, respectively.

Thereafter, the first judgement section 16 determines whether the maximum height of the white area is greater than a value obtained by multiplying the height of the binary image of the eye section by 0.9.

Here, the first judgement section 16 determines that the eye is in an opened state when determining that the maximum height of the white area is greater than the value obtained by multiplying the height of the binary image of the eye section by 0.9. In other words, when an eye is open, a proportion of the maximum height of the white area to the height of the binary image of the eye section approaches 1. Therefore, when the maximum height of the white area is greater than the value obtained by multiplying the height of the binary image of the eye section by 0.9, the first judgement section 16 determines that an eye in the eye section is in the opened state.

On the other hand, when determining that the maximum height of the white area is equal to or smaller than the value obtained by multiplying the height of the binary image of the eye section by 0.9, the first judgement section 16 determines whether the maximum height of the white area is smaller than a value obtained by multiplying the height of the binary image of the eye section by 0.6. Here, when determining that the maximum height of the white area is smaller than the value obtained by multiplying the height of the binary image of the eye section by 0.6, the first judgement section 16 determines that the eye is in a closed state. In other words, when an eye is closed, the maximum height of the white area is less than 60% of the height of the binary image of the eye section. Therefore, when the maximum height of the white area is smaller than the value obtained by multiplying the height of the binary image of the eye section by 0.6, the first judgement section 16 determines that the eye in the eye section is in the closed state.

On the other hand, when determining that the maximum height of the white area is equal to or greater than the value obtained by multiplying the height of the binary image of the eye section by 0.6, the first judgement section 16 determines that it is impossible to determine the eye opening state.

The way of detecting the eye opening state by the first judgement section 16 in Step S403 is not limited to the above-mentioned way. For example, the first judgement section 16 may determine that the eye is in the closed state when the maximum height of the white area is smaller than the value obtained by multiplying the height of the binary image of the eye section by 0.6. Further, the first judgement section 16 may determine that the eye is in the opened state when the maximum height of the white area is equal to or greater than the value obtained by multiplying the height of the binary image of the eye section by 0.6.

Subsequently, in Step S404, the first judgement section 16 determines whether the eye opening state detected in Step S403 coincides with an eye opening state indicated by the action information shown in Step S401.

When, in Step S404, the first judgement section 16 determines that the eye opening state detected in Step S403 coincides with the eye opening state indicated by the action information shown in Step S401 (YES in Step S404), in Step S405, the first judgement section 16 judges that the subject is of living body, outputs information indicating the judgement result to the second judgement section 17, and finishes the living body judgement process based on an opening state of an eye.

On the other hand, when, in Step S404, the first judgement section 16 determines that the eye opening state fails to coincide with the eye opening state indicated by the action information shown in Step S401 (NO in Step S404), in Step S406, the first judgement section 16 judges that the subject is not of living body, outputs information indicating the judgement result to the second judgement section 17, and finishes the living body judgement process based on an opening state of an eye.

Also, when, in Step S404, the first judgement section 16 determines that it is impossible to determine the eye opening state in Step S403, in Step S406, the first judgement section 16 judges that the subject is not of living body, outputs information indicating the judgement result to the second judgement section 17, and finishes the living body judgement process based on an opening state of an eye.

When, in Step S401, the action information instructing the person to blink a predetermined number of times is displayed on the display 3, in Step S402, the facial image acquisition section 15 acquires facial images as needed with a predetermined frame interval from the image capturing device 2. Every time a facial image is acquired, the first judgement section 16 executes Step S403 by use of the acquired facial image, and subsequently, executes Step S404.

In this case, when, in Step S404, a change from the eye opened state to the eye closed state can be detected a predetermined number of times or more from the detection results of eye opening state in each Step S403 within a predetermined maximum time, the first judgement section 16 determines that the eye opening state coincides with the eye opening state indicated by the action information shown in Step S401. In this case, in Step S405, the first judgement section 16 judges that the subject is of living body, outputs information indicating the judgement result to the second judgement section 17, and finishes the living body judgement process based on an opening state of an eye.

On the other hand, when, in Step S404, the change from the eye opened state to the eye closed state cannot be detected the predetermined number of times or more from the detection results of the eye opening state in each Step S403 within the predetermined maximum time, the first judgement section 16 determines that the eye opening state fails to coincide with the eye opening state indicated by the action information shown in Step S401. In this case, in Step S406, the first judgement section 16 judges that the subject is not of living body, outputs information indicating the judgement result to the second judgement section 17, and finishes the living body judgement process based on an opening state of an eye.

Living Body Judgement Process Based on Opening State of Mouth

Figure 7:
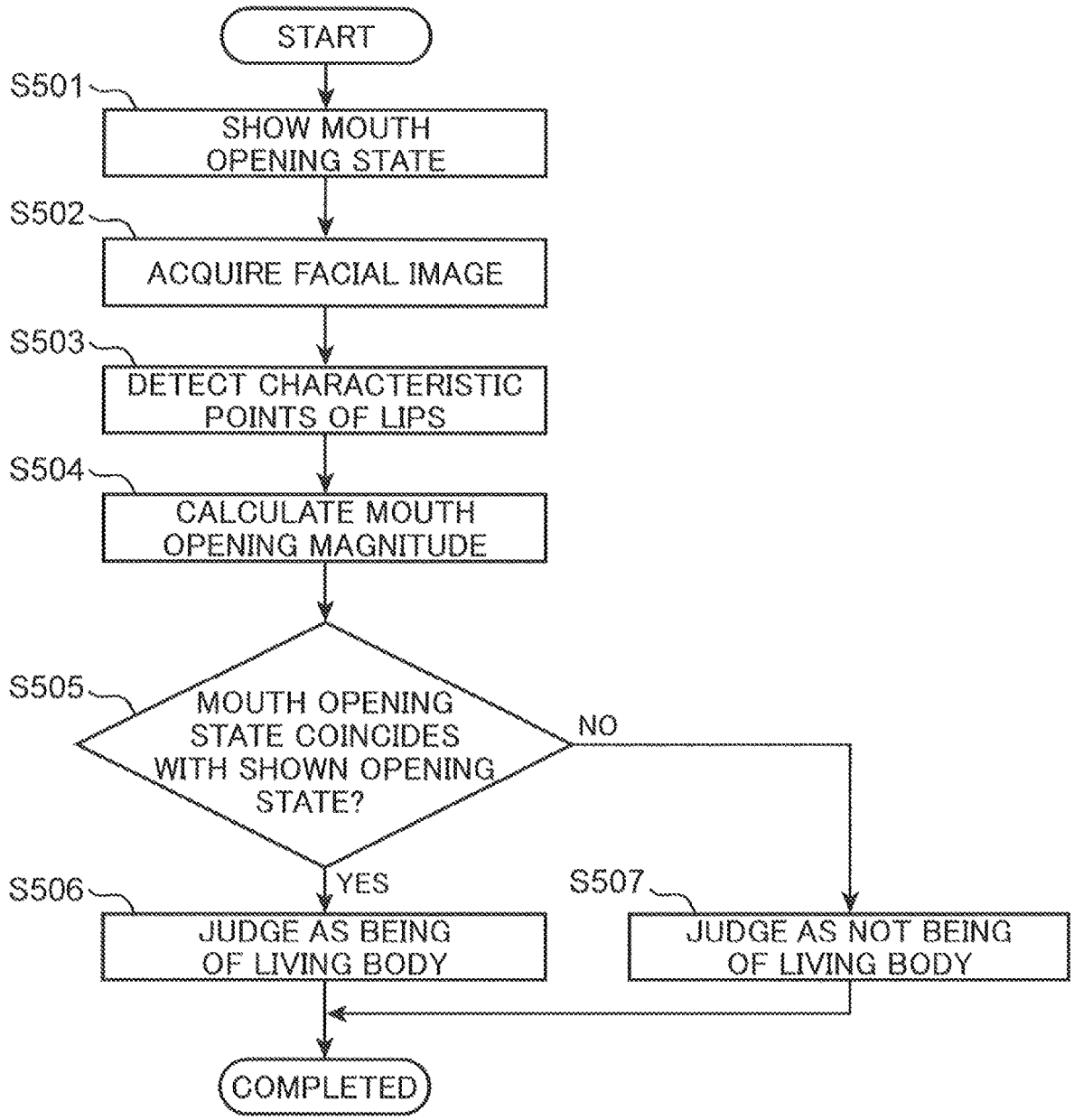
FIG. 7 is a flowchart showing an exemplary living body judgement process based on an opening state of a mouth.

Hereinafter, the living body judgement process based on an opening state of a mouth will be described in detail. FIG. 7 is a flowchart showing an exemplary living body judgement process based on the opening state of a mouth. When a living body judgement process based on the opening state of a mouth is executed, first, the output section 14 executes Step S501 corresponding to Step S103 shown in FIG. 3. In Step S501, the output section 14 displays on the display 3 action information instructing a person to open and close the mouth as an action required for the living body judgement process.

Specifically, in Step S501, the output section 14 displays on the display 3 action information instructing the person to open his/her mouth, action information instructing the person to close his/her mouth, or action information instructing the person to open and close his/her mouth a predetermined number of times. The output section 14 randomly determines a way of opening and closing the mouth to be instructed in the action information. However, the output section 14 is not limited to the present configuration, and may determine the way of opening and closing the mouth, which is to be instructed in the action information, in accordance with a predetermined rule, e.g., in the order described above.

Subsequently, the facial image acquisition section 15 executes Step S502 corresponding to Step S104 shown in FIG. 3. In Step S502, the facial image acquisition section 15 acquires a facial image containing a face of the subject from the image capturing device 2.

Thereafter, the first judgement section 16 executes the processings starting from Step S503 corresponding to Step S105 shown in FIG. 3.

In Step S503, the first judgement section 16 detects characteristic points of lips from the facial image acquired in Step S502.

Specifically, in Step S503, the first judgement section 16 first detects the face region 80 from the facial image acquired in Step S302 in the same manner as in Step S203 shown in FIG. 4, and detects the characteristic points of the lips by applying processing of landmark detection to the face region 80. FIG. 8 shows an example where four characteristic points 95 to 98 respectively arranged on upper, lower, left, and right ends of the lips are detected through application of the processing of landmark detection to the face region 80.

In Step S504, the first judgement section 16 calculates a mouth opening magnitude indicating a degree of mouth opening by use of the characteristic points of the lips detected in Step S503. Specifically, the first judgement section 16 divides a distance between the upper end 95 and the lower end 96 of the lips detected in Step S503 by a distance between the left end 97 and the right end 98 of the lips detected in Step S503, and finds a result of the division as the mouth opening magnitude. As a result, the mouth opening magnitude can be properly calculated regardless of individual differences in mouth size.

Subsequently, in Step S505, the first judgement section 16 determines, based on the opening magnitude calculated in Step S504, whether the mouth opening state coincides with the mouth opening state indicated by the action information shown in Step S501.

Specifically, in Step S505, the first judgement section 16 first determines the mouth opening state based on the opening magnitude calculated in Step S504. More specifically, the first judgement section 16 determines whether the mouth opening magnitude calculated in Step S504 is equal to or greater than a predetermined threshold value (for example, 0.3). When the opening magnitude calculated in Step S504 is equal to or greater than the predetermined threshold value, the first judgement section 16 determines that the mouth is in an opened state.

On the other hand, when the opening magnitude calculated in Step S504 is smaller than the predetermined threshold value, the first judgement section 16 determines that the mouth is in a closed state. Subsequently, the first judgement section 16 determines whether the mouth opening state determined based on the opening magnitude calculated in Step S504 coincides with a mouth opening state indicated by the action information shown in Step S501.

The way of determining the mouth opening state by the first judgement section 16 in Step S505 is not limited to the above-mentioned way by use of the mouth opening magnitude, and may include other ways.

When, in Step S505, the first judgement section 16 determines that the mouth opening state determined based on the mouth opening magnitude coincides with the mouth opening state indicated by the action information shown in Step S501 (YES in Step S505), in Step S506, the first judgement section 16 judges that the subject is of living body, outputs information indicating the judgement result to the second judgement section 17, and finishes the living body judgement process based on an opening state of a mouth.

On the other hand, when, in Step S505, the first judgement section 16 determines that the mouth opening state fails to coincide with the mouth opening state indicated by the action information shown in Step S501 (NO in Step S505), in Step S507, the first judgement section 16 judges that the subject is not of living body, outputs information indicating the judgement result to the second judgement section 17, and finishes the living body judgement process based on an opening state of a mouth.

When, in Step S501, the action information instructing the person to open and close his/her mouth a predetermined number of times is displayed on the display 3, in Step S502, the facial image acquisition section 15 acquires facial images as needed from the image capturing device 2 with a predetermined frame interval. Every time a facial image is acquired, the first judgement section 16 executes Step S503 and Step S504 by use of the acquired facial image, and subsequently, executes Step S505.

In this case, in Step S505, the first judgement section 16 continues determining the mouth opening state based on a mouth opening magnitude calculated in each Step S504 until the predetermined maximum time elapses. When a change from the mouth opened state to the mouth closed state can be detected a predetermined number of times or more from the detection results, the first judgement section 16 determines that the mouth opening state coincides with the mouth opening state indicated by the action information shown in Step S501. In this case, in Step S506, the first judgement section 16 judges that the subject is of living body, outputs information indicating the judgement result to the second judgement section 17, and finishes the living body judgement process based on an opening state of mouth.

On the other hand, when, in Step S504, the first judgement section continues determining the mouth opening state based on a mouth opening magnitude calculated in each Step S504 until the predetermined maximum time elapses, and the change from the mouth opened state to the mouth closed state cannot be detected the predetermined number of times or more from the detection results, the first judgement section 16 determines that the mouth opening state fails to coincide with the mouth opening state indicated by the action information shown in Step S501. In this case, in Step S507, the first judgement section 16 judges that the subject is not of living body, outputs information indicating the judgement result to the second judgement section 17, and finishes the living body judgement process based on an opening state of mouth.

Living Body Judgement Process Based on Wearing State of Glasses

Figure 9:
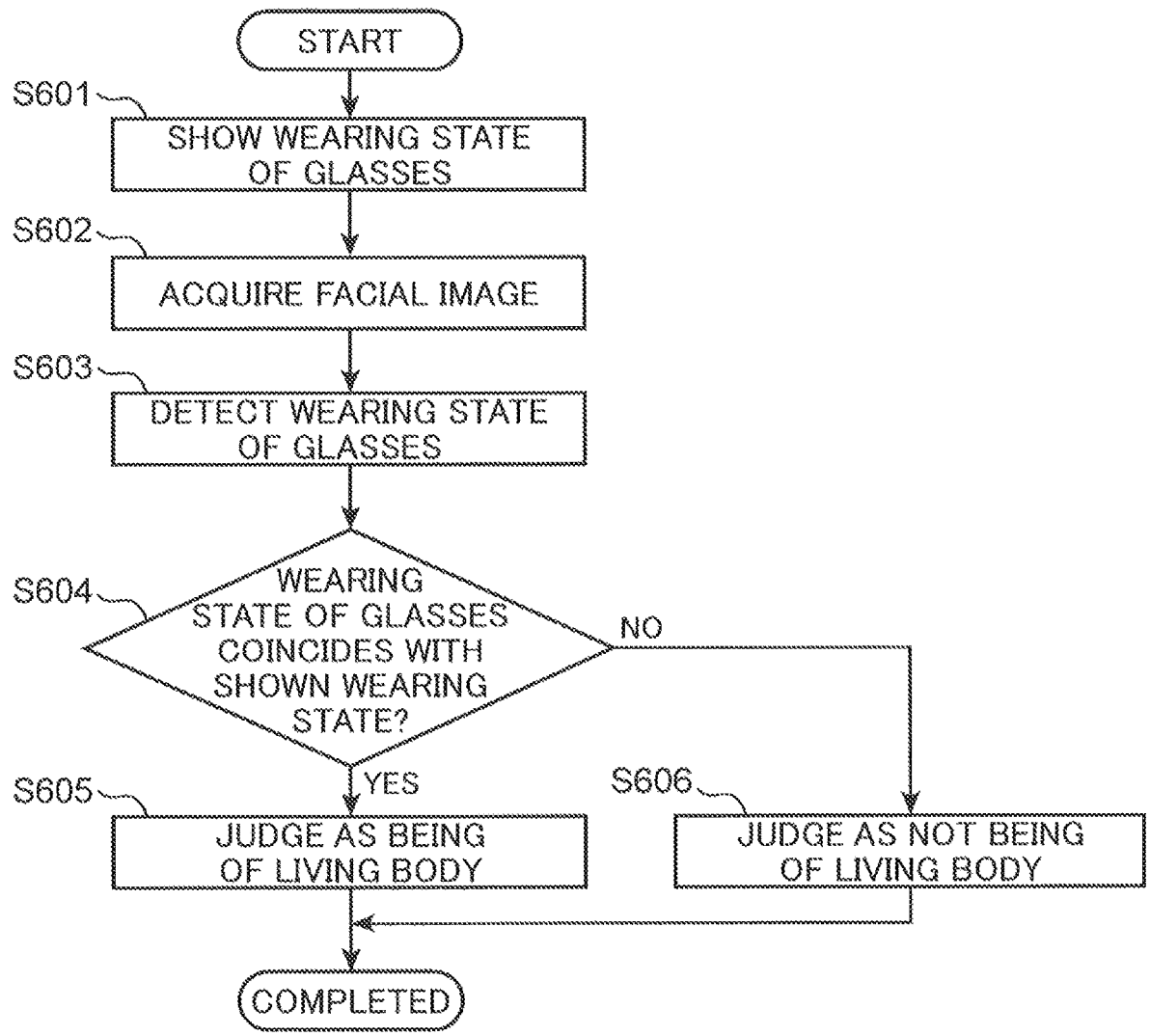
FIG. 9 is a flowchart showing an exemplary living body judgement process based on a wearing state of glasses.

Hereinafter, the living body judgement process based on a wearing state of glasses will be described in detail. FIG. 9 is a flowchart showing an exemplary living body judgement process based on the wearing state of glasses. When a living body judgement process based on the wearing state of glasses is executed, first, the output section 14 executes Step S601 corresponding to Step S103 shown in FIG. 3. In Step S601, the output section 14 displays on the display 3 action information instructing a person to put on and take off the glasses as an action required for the living body judgement process.

Specifically, in Step S601, the output section 14 displays on the display 3 action information instructing the person to wear his/her glasses (put on his/her glasses), action information instructing the person not to wear his/her glasses (take off his/her glasses), or action information instructing the person to put on and take off his/her glasses a predetermined number of times.

The output section 14 randomly determines a way of putting on and taking off the glasses to be instructed in the action information. However, the output section 14 is not limited to the present configuration, and may regularly determine the way of putting on and taking off the glasses to be instructed in the action information in accordance with a predetermined rule, such as determining in the order described above, for example.

Subsequently, the facial image acquisition section 15 executes Step S602 corresponding to Step S104 shown in FIG. 3. In Step S602, the facial image acquisition section 15 acquires a facial image containing a face of the subject from the image capturing device 2.

Thereafter, the first judgement section 16 executes the processings starting from Step S603 corresponding to Step S105 shown in FIG. 3.

In Step S603, the first judgement section 16 detects a wearing state of glasses from the facial image acquired in Step S602.

Specifically, in Step S603, the first judgement section 16 first detects the face region 80 from the facial image acquired in Step S302 in the same manner as in Step S303 shown in FIG. 5.

Subsequently, the first judgement section 16 binarizes the detected face region 80, and generates a binary image where pixels having a gradation value smaller than a threshold value are denoted by a first luminance value, and pixels having a gradation value equal to or greater than the threshold value are denoted by a second luminance value. When the face region 80 includes a colored image, the first judgement section 16 may convert the face region 80 to a grayscale image having a gradation value between 0 and 255 inclusive, for example, and execute a processing of binarization on the converted grayscale image.

As the processing of binarization, for example, Otsu's binarization processing can be adopted. The first luminance value denotes, for example, white, and the second luminance value denotes, for example, black. In this case, a binary image is generated where a dark area is colored in white and a bright area is colored in black. The luminance value of white is, for example, denoted by 255, and the luminance value of black is, for example, denoted by 0.

The first judgement section 16 executes a general processing of conversion when converting a colored image to a grayscale image. A processing of calculating an average gradation value of each of red component, green component, and blue component for each pixel constituting the face region 80 can be adopted as a general processing of conversion to a grayscale image. Besides, the first judgement section 16 may calculate a pixel value V of each pixel in the grayscale image by use of the following Equation (1).

$$V=0.299*R+0.587*G+0.114*B \quad (1)$$

In Equation (1), R denotes a red component value in each pixel of a colored image, G denotes a green component value in each pixel of the colored image, B denotes a blue component value in each pixel of the colored image.

Subsequently, the first judgement section 16 extracts, from the generated binary image, an estimated glasses region where the glasses are estimated to be present. Specifically, the first judgement section 16 extracts a region defined by a line indicating a level of three-tenths and a line indicating a level of six-tenths respectively from an upper side of the face region 80 in view of a general proportion of human face as an estimated glasses region.

Subsequently, the first judgement section 16 executes a processing of labeling on the extracted estimated glasses region. In the processing of labeling, a plurality of consecutive white pixels in a binary image is allotted with the same number. This processing of labeling enables a detection of a plurality of white areas each including a plurality of consecutive white pixels from the estimated glasses region. In this way, by preliminarily extracting the binary image of the estimated glasses region from the binary image of the face region 80, the area subjected to the processing of labeling can be narrowed. Consequently, time required for the processing of labeling can be reduced.

Thereafter, the first judgement section 16 calculates a width (horizontal length) of each of the plurality of white areas where a plurality of white pixels is consecutively arranged in the extracted estimated glasses region. Subsequently, the first judgement section 16 determines whether a width of the widest white area accounts for two-thirds or more of the width of the estimated glasses region.

The white area indicating a frame of the glasses includes a plurality of horizontally consecutive white pixels. The width of the widest white area accounting for two-thirds or more of the width of the estimated glasses region is deemed to indicate that the subject is in a state of wearing the glasses. Accordingly, when the length of the white area accounts for two-thirds or more of the width of the estimated glasses region, the first judgement section 16 determines that the subject is in the state of wearing the glasses. On the other hand, when the width of the widest white area fails to account for two-thirds or more of the width of the estimated glasses region, the first judgement section 16 determines that the subject is in a state of not wearing the glasses.

The way of detecting the wearing state of glasses by the first judgement section 16 in Step S603 is not limited to the above-mentioned way. For example, when an external light penetrates the frame of the glasses, or the frame of the glasses is colored, the detection of a white area indicating the frame of the glasses as an island-like area is liable to fail. Accordingly, when a predetermined number or more of white areas having a predetermined width or more is detected, the first judgement section 16 may determine that the subject is in the state of wearing the glasses. On the other hand, when less than the predetermined number of white areas having the predetermined width or more are detected, the first judgement section 16 may determine that the subject is in the state of not wearing the glasses.

Subsequently, in Step S604, the first judgement section 16 determines whether the wearing state of glasses detected in Step S603 coincides with a wearing state of glasses indicated by the action information shown in Step S601.

When, in Step S604, the first judgement section 16 determines that the wearing state of glasses detected in Step S603 coincides with the wearing state of glasses indicated by the action information shown in Step S601 (YES in Step S604), in Step S605, the first judgement section 16 judges that the subject is of living body, outputs information indicating the judgement result to the second judgement section 17, and finishes the living body judgement process based on a wearing state of glasses.

On the other hand, when, in Step S604, the first judgement section 16 determines that the wearing state of glasses fails to coincide with the wearing state of glasses indicated by the action information shown in Step S601 (NO in Step S604), in Step S606, the first judgement section 16 judges that the subject is not of living body, outputs information indicating the judgement result to the second judgement section 17, and finishes the living body judgement process based on a wearing state of glasses.

When, in Step 601, the action information instructing the person to put on and take off his/her glasses a predetermined number of times is displayed on the display 3, in Step S602, the facial image acquisition section 15 acquires facial images as needed from the image capturing device 2 with a predetermined frame interval. Every time a facial image is acquired, the first judgement section 16 executes Step S603 by use of the acquired facial image, and subsequently, executes Step S604.

In this case, when, in Step S604, a change from the state of not wearing the glasses to the state of wearing the glasses can be detected a predetermined number of times or more from the detection results of the wearing state of glasses in each Step S603 within a predetermined maximum time, the first judgement section 16 determines that the wearing state of glasses coincides with the wearing state of glasses indicated by the action information shown in Step S601. In this case, in Step S605, the first judgement section 16 judges that the subject is of living body, outputs information indicating the judgement result to the second judgement section 17, and finishes the living body judgement process based on a wearing state of glasses.

On the other hand, when, in Step S604, the change from the state of not wearing the glasses to the state of wearing the glasses cannot be detected the predetermined number of times or more from the detection results of the wearing state of glasses in each Step S603 within the predetermined maximum time, the first judgement section 16 determines that the wearing state of glasses fails to coincide with the wearing state of glasses indicated by the action information shown in Step S601. In this case, in Step S606, the first judgement section 16 judges that the subject is not of living body, outputs information indicating the judgement result to the second judgement section 17, and finishes the living body judgement process based on an wearing state of glasses.

Embodiment 2

When a face contained in a facial image is a face included in a photograph or a face projected on a display of a smartphone, a tablet, and the like, the facial image is liable to include an outer frame of the photograph or the display. Accordingly, prior to executing processings starting from Step S101 shown in FIG. 3, a judgement device 1 according to Embodiment 2 acquires a facial image containing a face of a subject from an image capturing device 2, and determines whether the acquired facial image includes an outer frame. When an outer frame is included, the judgement device 1 judges that the subject contained in the facial image is not of living body. When an outer frame is not included, the judgement device 1 executes processings starting from Step S101 shown in FIG. 3.

As a result, when the facial image includes an outer frame therearound, and it is substantially apparent that the subject is not of living body, the judgement device 1 according to Embodiment 2 detects an identity fraud without execution of the processings starting from Step S101 shown in FIG. 3. On the other hand, when the facial image does not include an outer frame therearound, the judgement device 1 according to Embodiment 2 makes it difficult to commit an identity fraud owing to an execution of the processings starting from Step S101 shown in FIG. 3 in the same manner as in Embodiment 1.

Figure 10:
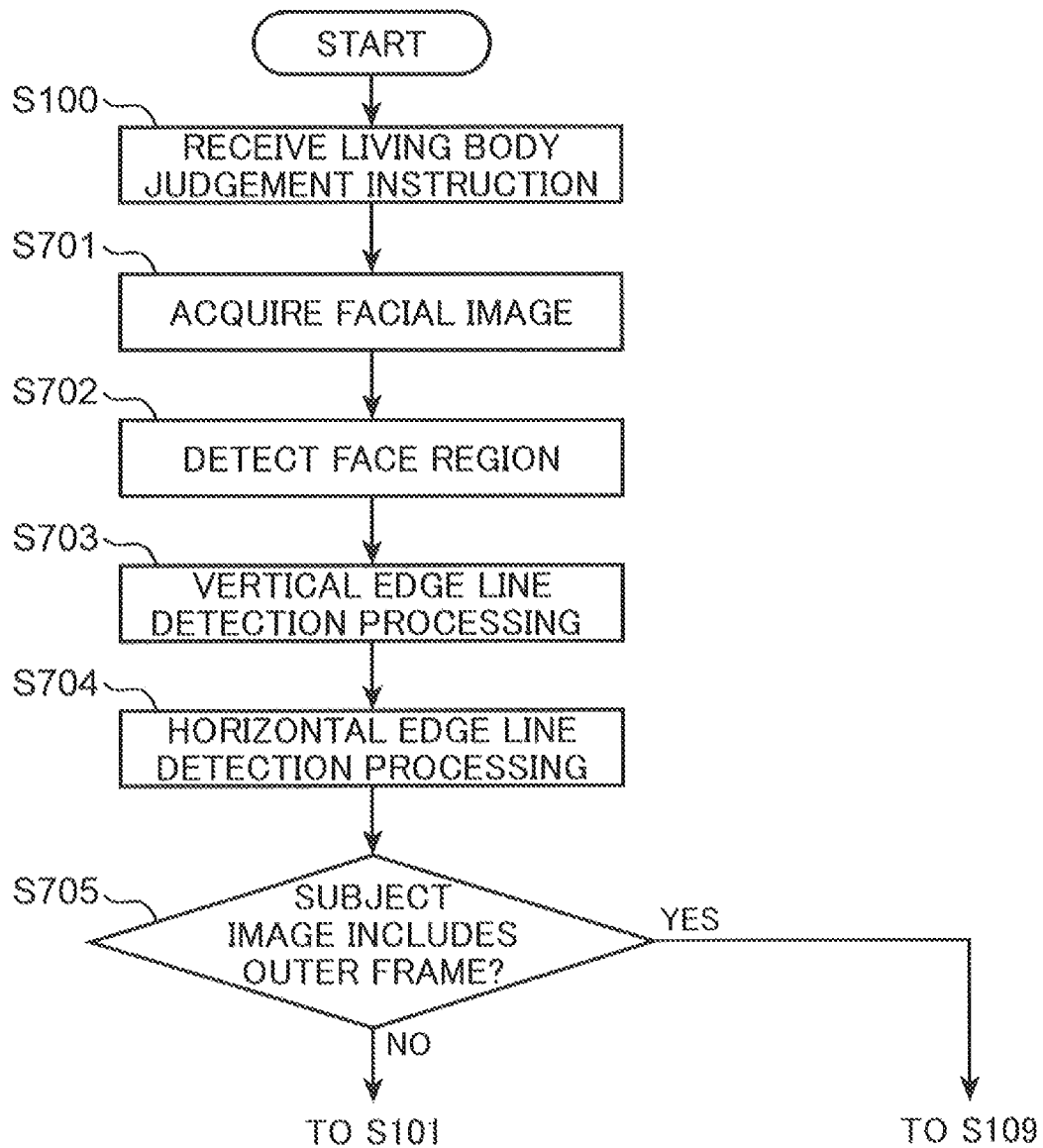
FIG. 10 is a flowchart showing an exemplary outer frame determination processing.

Hereinafter, the judgement device 1 according to Embodiment 2 will be described in detail. FIG. 10 is a flowchart showing an exemplary outer frame determination processing. When the reception section 11 receives an input of an instruction to execute a living body judgement in Step S100, the facial image acquisition section 15 acquires a facial image containing a face of the subject (hereinafter, referred to as "subject image") from the image capturing device 2 in Step S701.

Figure 11:
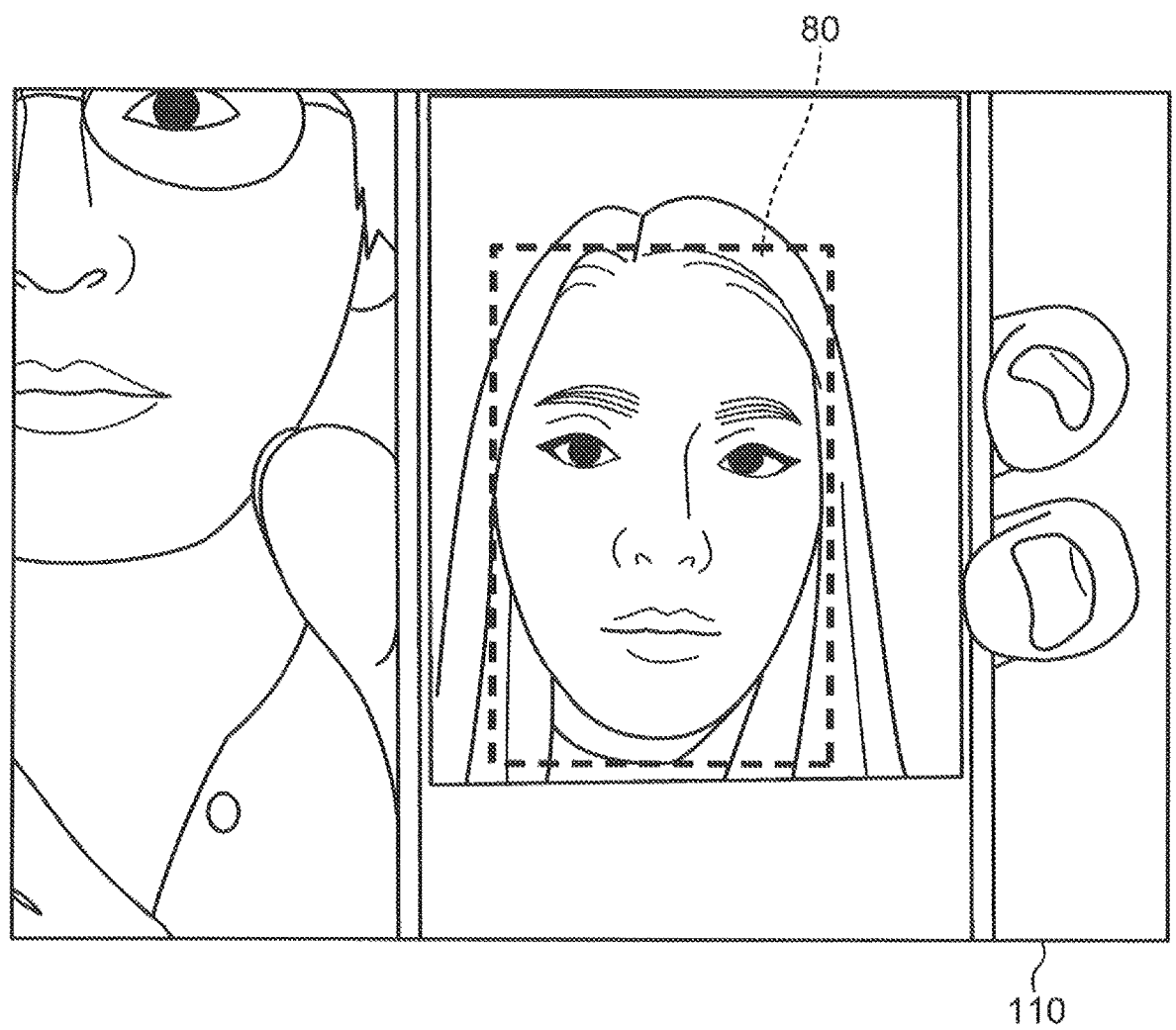
FIG. 11 is a diagram showing an exemplary face region detected from a subject image.

In Step S702, the second judgement section 17 detects the face region 80 from the subject image acquired in Step S701 in the same manner as in Step S303 shown in FIG. 5. FIG. 11 is a diagram showing an exemplary face region 80 detected from a subject image 110. For example, FIG. 11 shows an exemplary detection of a face region 80 containing a face of the subject projected on a display of a smartphone.

Subsequently, in Step S703, the second judgement section 17 executes a vertical edge line detection processing. The vertical edge line detection processing is a processing of detecting two vertical edge lines constituting an outer frame of a photograph or a display which may be contained in the subject image 110.

Specifically, in the vertical edge line detection processing, the second judgement section 17 first executes a processing of filtering by use of Sobel filter being a first order derivative filter, or Laplacian filter being a second order derivative filter on the subject image 110 only in the horizontal direction thereof to thereby detect horizontally-detected edge points from the subject image 110. The horizontally-detected edge points represent a group of pixels each having a luminance value remarkably different from that of a pixel horizontally adjacent thereto.

Figure 12:
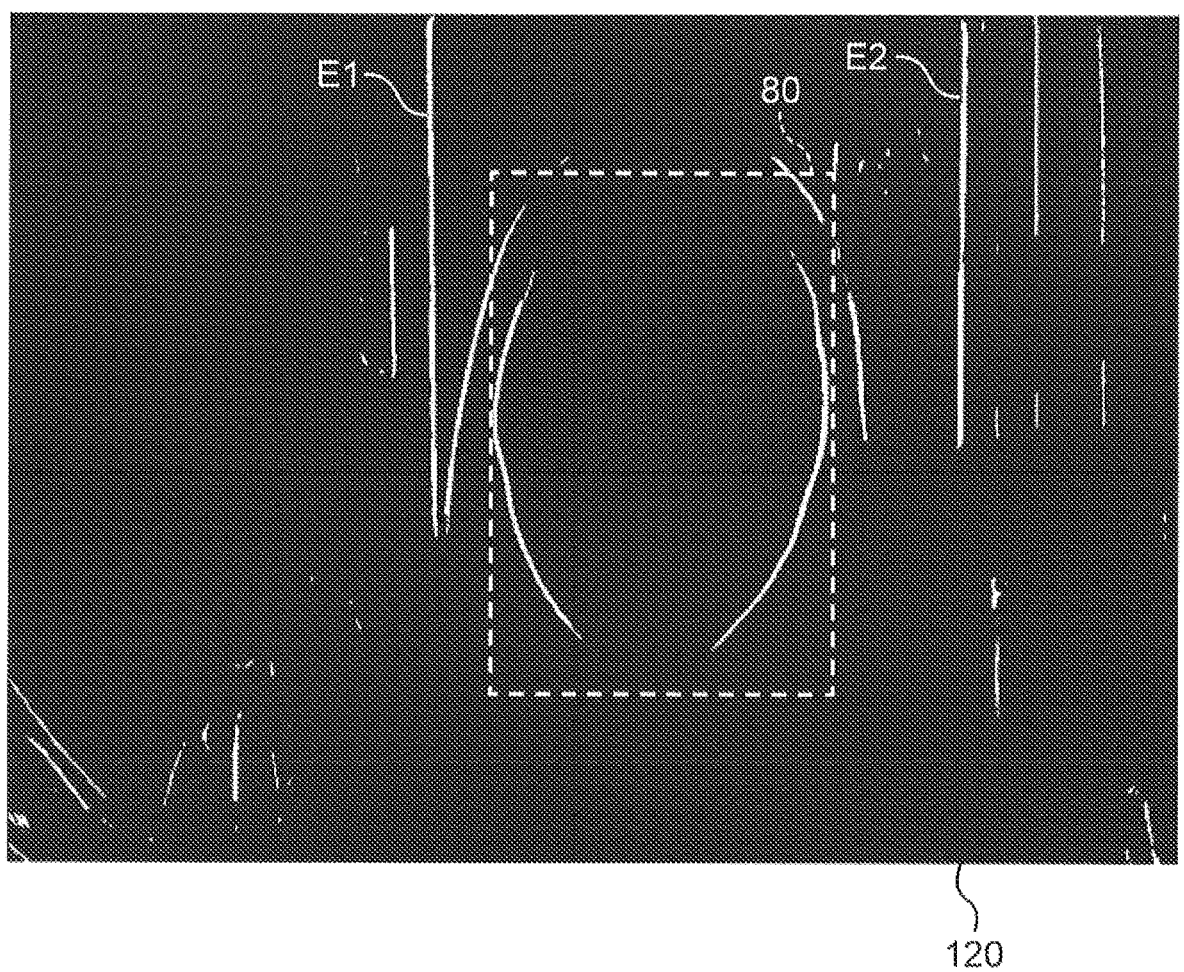
FIG. 12 is a diagram showing exemplary horizontally-detected edge points in a vertical edge line detection processing.

FIG. 12 is a diagram showing exemplary horizontally-detected edge points detected in a vertical edge line detection processing. For example, FIG. 12 shows an image 120 where horizontally-detected edge points detected by executing the processing of filtering described above only in the horizontal direction of the subject image 110 shown in FIG. 11 are represented by white pixels, whereas the other pixels in the subject image 110 are represented in black. Besides, in FIG. 12, the face region 80 detected from the subject image 110 shown in FIG. 11 is indicated with broken lines.

Thereafter, the second judgement section 17 detects, among the horizontally-detected edge points, a first edge line that is closest to a left end of the face region 80 and has a first predetermined length or greater, and a second edge line that is closest to a right end of the face region 80 and has the first predetermined length or greater, both extending vertically. For example, a proper length having a vertical length of the subject image 110 as a reference is adopted as the first predetermined length.

In the example of FIG. 12, horizontally-detected edge points E1 that are closest to the left end of the face region 80, and have a first predetermined length or greater, and horizontally-detected edge points E2 that are closest to the right end of the face region 80, have the first predetermined length or greater, and are vertically continuous are detected as horizontally-detected edge points that extend vertically. Therefore, the second judgement section 17 detects the horizontally-detected edge points E1 as the first edge line, and the horizontally-detected edge points E2 as the second edge line.

Subsequently, in Step S704, the second judgement section 17 executes a horizontal edge line detection processing. The horizontal edge line detection processing is a processing of detecting two horizontal edge lines constituting an outer frame of a photograph or a display which may be contained in the subject image 110.

Specifically, in the horizontal edge line detection processing, the second judgement section 17 first executes the same processing of filtering as in the vertical edge line detection processing only in a vertical direction of the subject image 110 to thereby detect vertically-detected edge points from the subject image 110. The vertically-detected edge points represent a group of pixels each having a luminance value remarkably different from that of a pixel vertically adjacent thereto.

Figure 13:
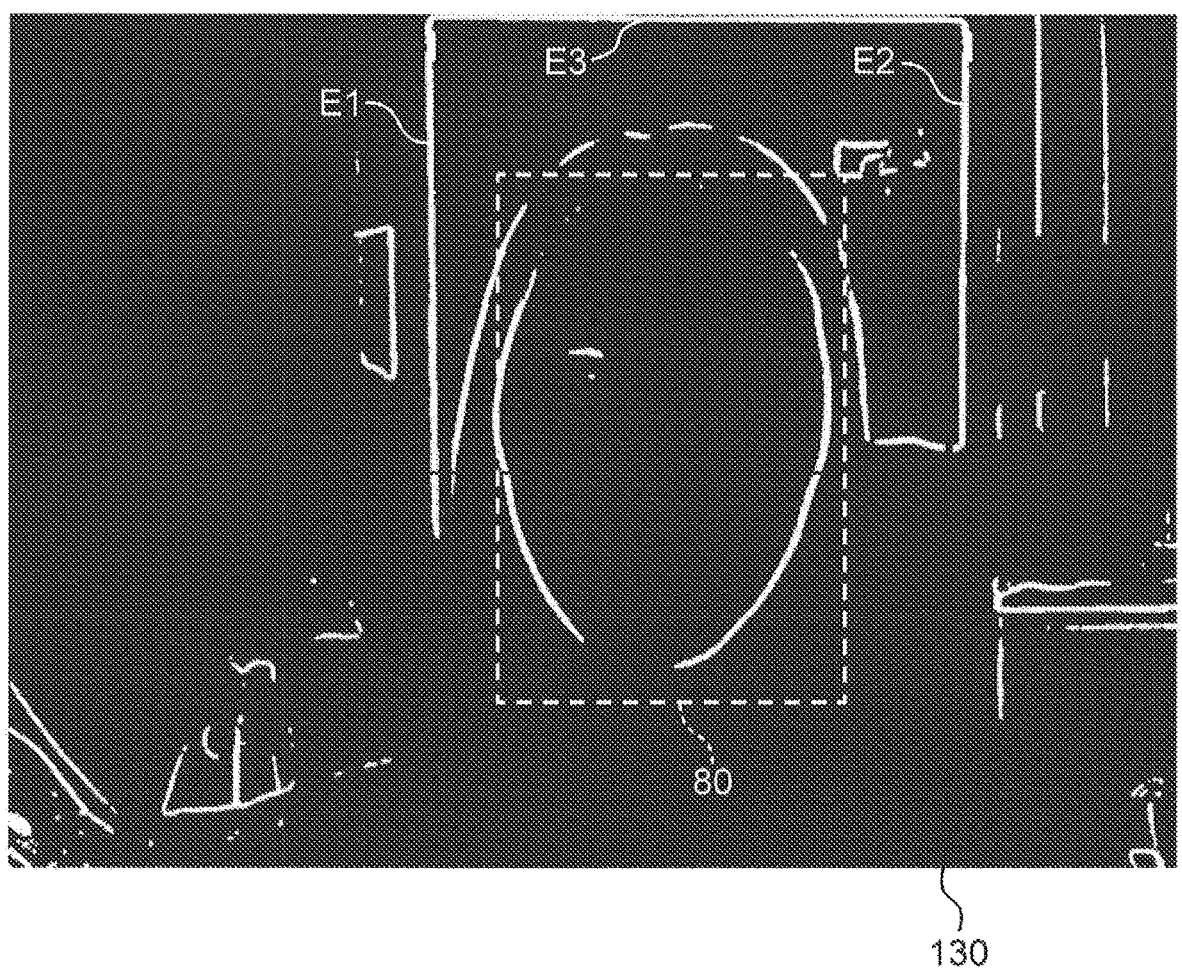
FIG. 13 is a diagram showing exemplary vertically-detected edge points in a horizontal edge line detection processing.

FIG. 13 is a diagram showing exemplary vertically-detected edge points detected in a horizontal edge line detection processing. For example, FIG. 13 shows an image 130 based on the image 120 shown in FIG. 12 and in which vertically-detected edge points detected by executing the processing of filtering described above on the subject image 110 shown in FIG. 11 are additionally represented by white pixels.

Thereafter, the second judgement section 17 detects, among the vertically-detected edge points, a third edge line that is closest to an upper end of the face region 80, has both end points closer to the face region 80 than the first edge line and the second edge line, and has a second predetermined length or greater, and a fourth edge line that is closest to a lower end of the face region 80, has both end points closer to the face region 80 than the first edge line and the second edge line, and has the second predetermined length or greater, both extending horizontally. For example, a proper length having a horizontal length of the subject image 110 as a reference is adopted as the second predetermined length.

In the example of FIG. 13, vertically-detected edge points E3 that are closest to the upper end of the face region 80, have both end points closer to the face region 80 than the horizontally-detected edge points E1 detected as the first edge line and the horizontally-detected edge points E2 detected as the second edge line, and have the second predetermined length or greater are detected as vertically-detected edge points that are horizontally continuous. However, no vertically-detected edge points that are closest to the lower end of the face region 80, have both end points closer to the face region 80 than the first edge line and the second edge line, and have the second predetermined length or greater are detected. Therefore, the second judgement section 17 detects the vertically-detected edge points E3 as the third edge line without detecting the fourth edge line.

Subsequently, in Step S705, the second judgement section 17 determines whether the subject image 110 includes an outer frame based on the detection results from the vertical edge line detection processing and the horizontal edge line detection processing.

Specifically, in Step S705, the second judgement section 17 determines that the subject image 110 includes an outer frame when a total number of edge lines detected in the vertical edge line detection processing and the horizontal edge line detection processing is three or more. In the example of FIG. 13 described above, three edge lines including the first, second, and third edge lines are detected in the vertical edge line detection processing and the horizontal edge line detection processing. Therefore, the second judgement section 17 determines that the subject image 110 includes an outer frame.

When the subject image 110 is determined to include an outer frame in Step S705 (YES in Step S705), the processings starting from Step S101 shown in FIG. 3 are omitted, and the processings starting from Step S109 shown in FIG. 3 are executed. On the other hand, when the subject image 110 is determined to include no outer frame in Step S705 (NO in Step S705), the processings starting from Step S101 shown in FIG. 3 are executed.

A malicious person, who knows that a subject is judged as not being of living body when the subject image 110 is determined to include an outer frame of a photograph or a display, is liable to bring the photograph or the display close to the image capturing device 2 so as not to include an outer frame in the subject image 110.

Accordingly, the second judgement section 17 may determine that the subject image 110 includes an outer frame in Step S705 omitting Step S703 and Step S704 when the face region 80 detected in Step S702 has a height greater than a predetermined upper limit, or a width greater than a predetermined upper limit.

The height of the face region 80 indicates a vertical length of the face region 80. The upper limit of the height may be set to account for 90% or more of the vertical length of the subject image 110. However, the upper limit of the height is not limited to this height. The width of the face region 80 indicates a horizontal length of the face region 80. The upper limit of the width may be set to account for 90% or more of the horizontal length of the subject image 110. However, the upper limit of the width is not limited to this width.

According to the present configuration, the subject image 110 is determined to include an outer frame when the face region 80 detected from the subject image 110 has a size exceeding the upper limit of the width or the upper limit of the height because a malicious person has brought a photograph or a display containing a face of a different person close to an image capturing device 2 so as not to include an outer frame of the display in the subject image 110. In this case, the processings starting from Step S109 shown in FIG. 3 are executed, and the subject is judged as not being of living body. Therefore, the configuration can keep a subject intending to commit an identity fraud by use of a photograph or a display containing a face of a different person from bringing the photograph or display close to an image capturing device 2 so as not to include an outer frame of the photograph or display in the subject image 110.

In the way of determining whether the subject image 110 shown in FIG. 10 includes an outer frame, the subject image 110 is determined to include no outer frame when the second judgement section 17 fails to detect three or more edge lines in the vertical edge line detection processing and the horizontal edge line detection processing. Therefore, a malicious person is liable to cause the image capturing device 2 to take an image of a photograph or a display containing a face of a different person in such a manner as to avoid inclusion of two or more frame edges constituting an outer frame of the photograph or the display in the subject image 110.

Figure 14:
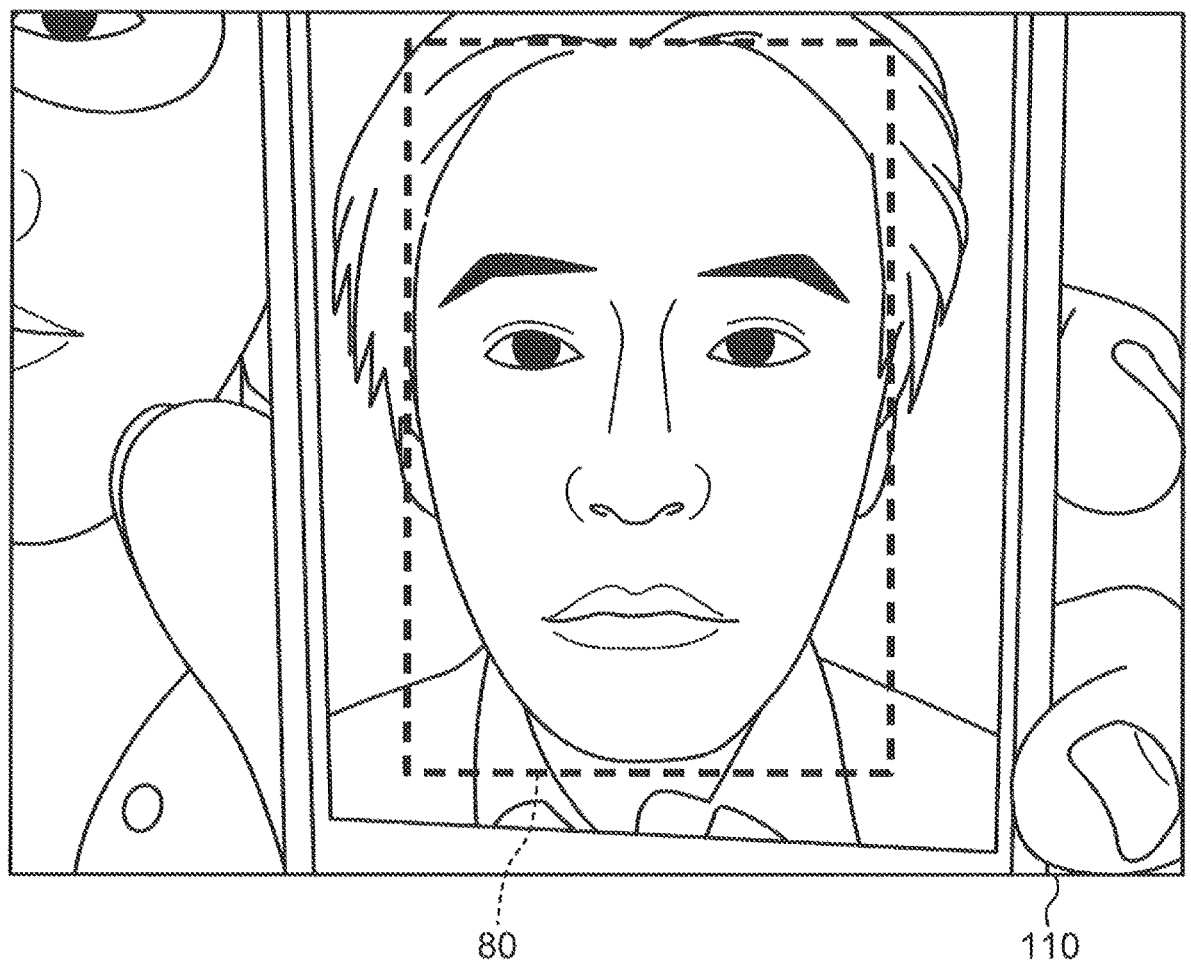
FIG. 14 is a diagram showing an exemplary face region contained in a subject image.

FIG. 14 is a diagram showing an exemplary face region 80 contained in a subject image 110. Specifically, for example, as shown in FIG. 14, a malicious person is liable to cause the image capturing device 2 to take an image of the display in such a manner that an upper end of the face of the different person is located close to the upper end of the subject image 110, or a lower end of the face of the different person is located close to the lower end of the subject image 110. In these cases, for example, as shown in FIG. 14, only the right and left frame edges constituting an outer frame of the display may be included in the subject image 110.

Accordingly, in Step S705, the second judgement section 17 may further determine that the subject image 110 includes an outer frame when a first edge line and a second edge line are detected in the vertical edge line detection processing in Step S703 while the upper end of the face region 80 detected in Step S702 falls within a predetermined first margin from the upper end of the subject image 110, or the lower end of the face region 80 falls within a predetermined second margin from the lower end of the subject image 110.

For example, the first margin and the second margin may be set to account for 10% or less of the vertical length (height) of the subject image 110. According to the present configuration, the subject image 110 can be determined to include an outer frame even when only a pair of left and right frame edges of the display showing the face of the different person is included in the subject image 110.

Further, a malicious person is liable to cause the image capturing device 2 to take an image of a photograph or a display containing a face of a different person in such a manner that the face of the different person is located close to the left end or the right end of the image taken by the image capturing device 2 in order to avoid the inclusion of the two or more frame edges constituting the outer frame of the photograph or the display in the subject image 110.

Figure 15:
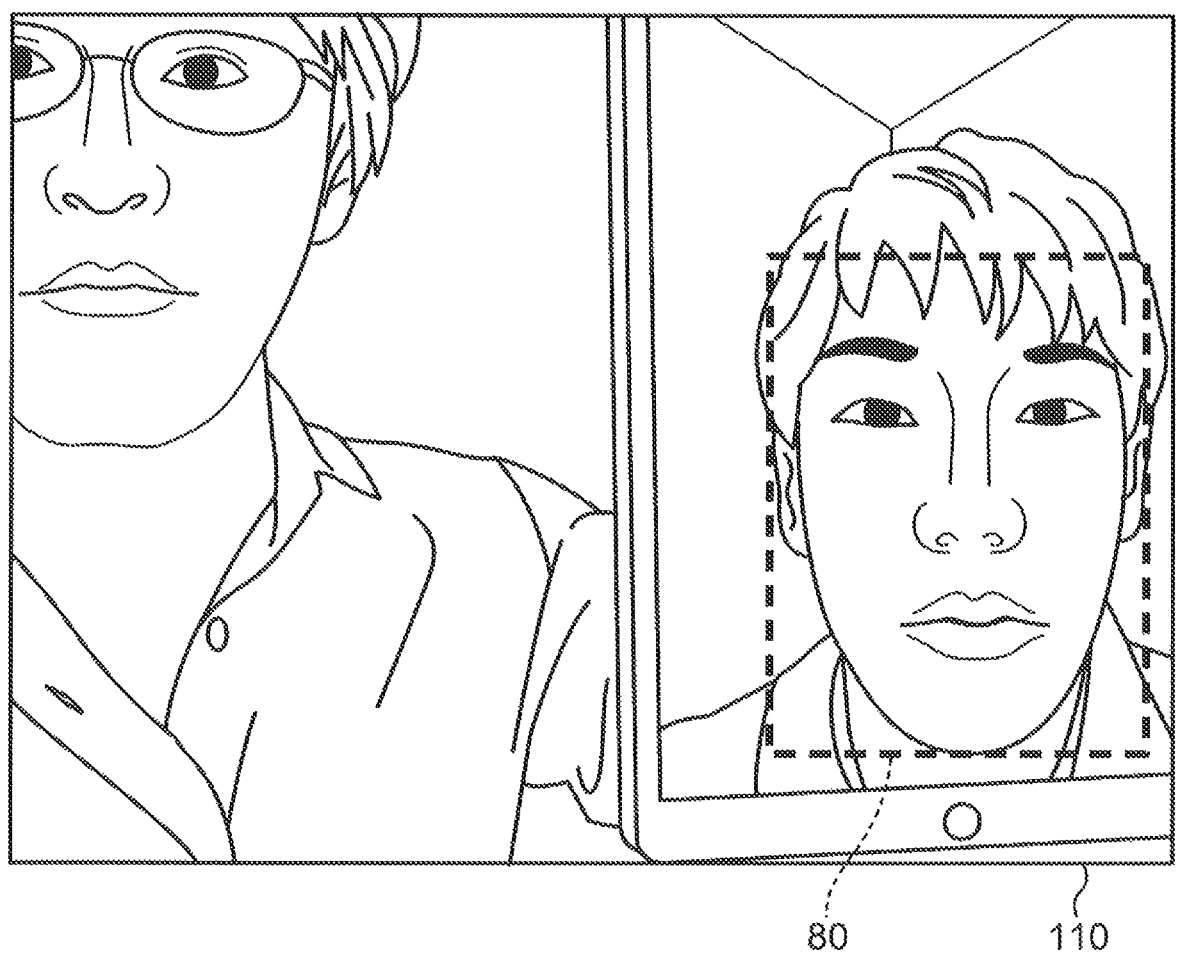
FIG. 15 is a diagram showing another exemplary face region contained in a subject image.

FIG. 15 is a diagram showing another exemplary face region 80 contained in a subject image 110. For example, when a malicious person causes the image capturing device 2 to take an image of the display containing a face of the different person in such a manner that the face of the different person is located close to the right end of the subject image 110, only left and lower frame edges intersecting to form an L-shape and constituting an outer frame of the display are liable to be included in the subject image 110 as shown in FIG. 15. Otherwise, in this case, only L-shaped intersecting left and upper frame edges constituting the outer frame of the display are liable to be included in the subject image 110. Similarly, when a malicious person causes the image capturing device 2 to take an image of the display containing a face of the different person in such a manner that the face of the different person is located close to the left end of the subject image 110, only right and upper or lower frame edges intersecting to form an L-shape and constituting the outer frame of the display are liable to be included in the subject image 110.

Accordingly, in Step S705, the second judgement section 17 may further determine that the subject image 110 includes an outer frame when the first edge line or the second edge line detected in the vertical edge line detection processing in Step S703 intersects the third edge line or the fourth edge line detected in the horizontal edge line detection processing in Step S704 while the left end of the face region 80 detected in Step S702 falls within a predetermined third margin from the left end of the subject image 110, or the right end of the face region 80 falls within a predetermined fourth margin from the right end of the subject image 110.

For example, the third margin and the fourth margin may be set to account for 1 to 5% of the horizontal length (width) of the subject image 110. However, the third margin and the fourth margin are not limited to this length.

In other words, the second judgement section 17 may determine that the subject image 110 includes the outer frame when L-shaped two intersecting edge lines are detected in the vertical edge line detection processing in Step S703 and the horizontal edge line detection processing in Step S704 while the left end of the face region 80 detected in Step S702 falls within the predetermined third margin from the left end of the subject image 110, or the right end of the face region 80 falls within the predetermined fourth margin from the right end of the subject image 110.

According to the present configuration, the subject image 110 can be determined to include an outer frame even when only L-shaped two intersecting frame edges such as the left and lower frame edges constituting the outer frame of the display showing the face of the different person are included in the subject image 110.

The present disclosure may adopt the following modifications.

(1) When, in Step S102 shown in FIG. 3, each of two or more living body judgement processes selected in Step S101 is executed, the processings corresponding to Step S103 through Step S105 may be repeated a plurality of times in each living body judgement process. Further, in the processing corresponding to each Step S103, the output section 14 may randomly determine the action to be shown to the person.

(2) For example, when the living body judgement process based on the orientation of an eye is executed in Step S102 (FIG. 3), the execution of the processings of Step S301 (FIG. 5) corresponding to Step S103 (FIG. 3) and Step S302 (FIG. 5) corresponding to Step S104 (FIG. 3), and the processings starting from Step S303 (FIG. 5) corresponding to Step S105 (FIG. 3) may be repeated a plurality of times. Further, in each Step S301 (FIG. 5), the output section 14 may randomly determine an eye orientation to be instructed in the action information shown on the display 3.

According to the present configuration, the execution patterns of living body judgement processes exponentially increase according to the number, the contents, and the execution order of the living body judgement processes to be executed for judging whether a subject is of living body, and the number and the contents of the actions to be shown in each living body judgement process. This makes it further difficult for a malicious person to prepare in advance a facial image which would be judged as being of living body.

(2) In Step S101 shown in FIG. 3, the judgement way determination section 12 may detect a state of the subject, and select a living body judgement process that shows an action suitable for the detected state of the subject.

For example, the present configuration may be embodied in a manner described below. The judgement way determination section 12 first causes the image capturing device 2 to acquire a facial image containing a face of the subject in Step S101. Thereafter, the judgement way determination section 12 inputs the acquired facial image into a classifier for detecting the face region, and detects the face region 80.

Subsequently, the judgement way determination section 12 inputs the detected face region 80 into a classifier for detecting a glasses region, and detects the glasses region included in the face region 80. When the glasses region is not detected by a detector, the subject is with naked eyes. Therefore, the judgement way determination section 12 selects two or more living body judgement processes except for the living body judgement process based on a wearing state of glasses among a plurality of living body judgement processes.

Further, the judgement way determination section 12 may be configured to input the detected face region 80 into a classifier for detecting a sunglasses region, and detect the sunglasses region included in the face region 80. When the sunglasses region is detected by the detector, the subject is in a state not allowing a detection of an orientation of an eye and an opening state of an eye. Therefore, the judgement way determination section 12 may be configured to select two or more living body judgement processes except for the living body judgement processes based on the orientation of an eye and the opening state of an eye among a plurality of living body judgement processes.

Further, the judgement way determination section 12 may be configured to input the detected face region 80 into a classifier for detecting a face mask region, and detect the face mask region included in the face region 80. When the face mask region is detected by the detector, the subject is in a state not allowing a detection of an opening state of a mouth. Therefore, the judgement way determination section 12 may be configured to select two or more living body judgement processes except for the living body judgement process based on the opening state of a mouth among a plurality of living body judgement processes.

According to the present configuration, two or more living body judgement processes that show actions suitable for the state of the subject may be selected as the living body judgement processes executed for the judgement as to whether the subject is of living body.

(3) In Step S107 shown in FIG. 3, the second judgement section 17 may be configured to convert a judgement result by the first judgement section 16 in each of the two or more living body judgement processes selected in Step S101 into a numerical value, weight each converted result with a coefficient specified for each living body judgement process, and calculate the sum of the weighted results. Further, the second judgement section 17 may be configured to determine that the judgement results by the first judgement section 16 satisfy a predetermined condition when the sum of the weighted results meets a predetermined numerical criterion.

For example, the present configuration may be embodied in a manner described below. When judging that the subject is of living body in each of the two or more living body judgement processes selected in Step S101, the first judgement section 16 converts the judgement result into the numerical value of 1. On the other hand, when judging that the subject is not of living body, the first judgement section 16 converts the judgement result into the numerical value of 0. Further, the results are defined to meet a numerical criterion when the threshold value is set to two-thirds of the number of the two or more living body judgement processes selected in Step S101, and the sum of the weighted results of the living body judgement processes is equal to or greater than the threshold value.

In this case, the second judgement section 17 calculates the sum of the weighted judgement results of the living body judgement processes where the coefficient specified for each living body judgement process is 1. The numerical criterion is met when the sum of the weighted results is equal to or greater than the threshold value. Thus, the second judgement section 17 determines that the judgement results by the first judgement section 16 satisfy the predetermined condition. On the other hand, the numerical criterion is not met when the sum of the weighted results is smaller than the threshold value. Thus, the second judgement section 17 determines that the judgement results by the first judgement section 16 fail to satisfy the predetermined condition.

Here, we consider a case where the living body judgement process based on the face orientation and the living body judgement process based on the eye orientation are selected in Step S101. Further, we suppose that, in this case, the action information instructing a person to orient his/her face toward the right is displayed on the display 3 in Step S201 shown in FIG. 4, and the action information instructing the person to orient his/her eye toward the right is displayed on the display 3 in Step S301 shown in FIG. 5. Additionally, we set the coefficient for the living body judgement process based on the face orientation used for the calculation of the sum of weighted judgement results to 0.7, and the coefficient for the living body judgement process based on the eye orientation to 0.3 considering that the living body judgement according to the living body judgement process based on the face orientation has an accuracy higher than the judgement according to the living body judgement process based on the eye orientation.

In this case, in Step S206 shown in FIG. 4, the first judgement section 16 outputs, as the judgement result converted into a numerical value, a value obtained from the division of the value of the horizontal component of the face orientation calculated in Step S204 and Step S205 by the value of the horizontal component of the face orientation of a face oriented exactly laterally and toward the right. Similarly, in Step S306 shown in FIG. 5, the first judgement section 16 outputs, as the judgement result converted into a numerical value, a value obtained from the division of the value of the eye orientation in the horizontal direction calculated in Step S305 by the value of the eye orientation in the horizontal direction of an eye oriented exactly laterally and toward the right. Further, the results are deemed to meet a numerical criterion when the threshold value is set to two-thirds of the number of the living body judgement processes selected in Step S101, and the sum of the weighted judgement results of the living body judgement processes is equal to or greater than the threshold value.

In this case, the numerical criterion is met when the sum of the weighted results of the judgements by the first judgement section 16, which is represented by the sum of the judgement result of the living body judgement process based on the face orientation multiplied by the coefficient 0.7 and the judgement result of the living body judgement process based on the eye orientation multiplied by the coefficient 0.3, is equal to or greater than the threshold value. Thus, the second judgement section 17 determines that the judgement results by the first judgement section 16 satisfy the predetermined condition. On the other hand, the numerical criterion is not met when the sum of the weighted results is smaller than the threshold value. Thus, the second judgement section 17 determines that the judgement results by the first judgement section 16 fail to satisfy the predetermined condition.

According to the present configuration, as shown by the examples described above, the accuracy in the judgement as to whether a subject is of living body can be improved by, for example, regulating the coefficient according to the judgement accuracy of each living body judgement process.

INDUSTRIAL APPLICABILITY

According to the present disclosure, the accuracy of a living body judgement can be improved. Thus, the present disclosure is useful in the technical field of the living body judgement.

The invention claimed is:

1. A judgement method for a judgement device, comprising:
by a computer of the judgement device,
selecting two or more living body judgement processes among a plurality of living body judgement processes for judging whether a subject contained in an image is of living body;
determining an order of executing the two or more selected living body judgement processes;
executing the two or more selected living body judgement processes in the determined order;
executing, in each of the two or more selected living body judgement processes: (1) a processing of showing a subject an action required for the living body judgement process; (2) a processing of acquiring a facial image containing a face of the subject when acting in accordance with the shown action; and (3) a processing of judging whether the subject is of living body based on a feature of a section of the face contained in the facial image;
determining whether judgement results obtained from the two or more selected living body judgement processes satisfy a predetermined condition; and
judging that the subject is of living body when the judgement results satisfy the predetermined condition, and judging that the subject is not of living body when the judgement results fail to satisfy the predetermined condition,
wherein, prior to the selection of two or more living body judgment processes from among the plurality of living body judgement processes, a state of the subject is detected, and
the selection of two or more living body judgment processes includes eliminating any living body judgement process that includes an action unsuitable for judging whether the subject contained in the image is of living body based on the detected state of the subject.

2. The judgement method according to claim 1, wherein in the selection of two or more living body judgement processes,
two or more living body judgement processes are randomly selected among the plurality of living body judgement processes.

3. The judgement method according to claim 1, wherein in the determination of the order of executing the two or more selected living body judgement processes,
the order of executing the two or more selected living body judgement processes is randomly determined.

4. The judgement method according to claim 1, wherein the plurality of living body judgement processes includes:
a living body judgement process having an orientation of the face as the feature of the section of the face;
a living body judgement process having an orientation of an eye as the feature of the section of the face;
a living body judgement process having an opening state of an eye as the feature of the section of the face;
a living body judgement process having an opening state of a mouth as the feature of the section of the face; and a living body judgement process having a wearing state of glasses as the feature of the section of the face.

5. The judgement method according to claim 1, wherein in each of the two or more selected living body judgement processes:
the processings (1) through (3) are executed a plurality of times; and
an action to be shown to the subject in the processing (1) is randomly determined.

6. The judgement method according to claim 1, wherein in the determination as to whether the judgement results satisfy the predetermined condition,
the judgement result is converted into a numerical value, the converted results are each weighted with a coefficient specified for each living body judgement process, and when a sum of the weighted results meets a predetermined numerical criterion, the judgement results are determined to satisfy the predetermined condition.

7. The judgement method according to claim 1, further comprising:
by the computer,
acquiring a subject image containing the face of the subject; and
determining whether the subject image includes an outer frame surrounding the face of the subject, judging that the subject is not of living body when the subject image is determined to include the outer frame, and executing the processings starting from the selection of two or more living body judgement processes when the subject image is determined to include no outer frame.

8. The judgement method according to claim 7, wherein in the determination as to whether the subject image includes the outer frame:
a face region including the face of the subject is detected from the subject image;
a vertical edge line detection processing is executed which detects, among vertically extending edge lines contained in the subject image, a first edge line closest to a left end of the face region and having a first predetermined length or greater, and a second edge line closest to a right end of the face region and having the first predetermined length or greater;
a horizontal edge line detection processing is executed which detects, among horizontally extending edge lines contained in the subject image, a third edge line closest to an upper end of the face region, having both end points closer to the face region than the first edge line and the second edge line, and having a second predetermined length or greater, and a fourth edge line closest to a lower end of the face region, having both end points closer to the face region than the first edge line and the second edge line, and having the second predetermined length or greater; and
the subject image is determined to include the outer frame when a total number of edge lines detected in the vertical edge line detection processing and the horizontal edge line detection processing is three or more.

9. The judgement method according to claim 7, wherein in the determination as to whether the subject image includes the outer frame:
a face region including the face of the subject is detected from the subject image; and
the subject image is determined to include the outer frame when the face region has a width greater than a predetermined upper limit, or a length greater than a predetermined upper limit.

10. The judgement method according to claim 8, wherein in the determination as to whether the subject image includes the outer frame:
a face region including the face of the subject is detected from the subject image; and
the subject image is determined to include the outer frame when the first edge line and the second edge line are detected in the vertical edge line detection processing while the upper end of the face region falls within a predetermined first margin from an upper end of the subject image, or the lower end of the face region falls within a predetermined second margin from a lower end of the subject image.

11. The judgement method according to claim 8, wherein in the determination as to whether the subject image includes the outer frame,
the subject image is determined to include the outer frame when the first edge line or the second edge line detected in the vertical edge line detection processing intersects the third edge line or the fourth edge line detected in the horizontal edge line detection processing while the left end of the face region falls within a predetermined third margin from a left end of the subject image, or the right end of the face region falls within a predetermined fourth margin from a right end of the subject image.

12. A judgement device, comprising:
a judgement way determination section for selecting two or more living body judgement processes among a plurality of living body judgement processes for judging whether a subject contained in an image is of living body, and determining an order of executing the two or more selected living body judgement processes;
an execution section for executing each of the two or more selected living body judgement processes in the determined order;
an output section for showing, in each of the two or more selected living body judgement processes, a subject an action required for the living body judgement process; a facial image acquisition section for acquiring a facial image containing a face of the subject when acting in accordance with the shown action; and a first judgement section for judging whether the subject is of living body based on a feature of a section of the face contained in the facial image; and
a second judgement section for determining whether judgement results obtained from the two or more selected living body judgement processes satisfy a predetermined condition, judging that the subject is of living body when the judgement results satisfy the predetermined condition, and judging that the subject is not of living body when the judgement results fail to satisfy the predetermined condition,
wherein, prior to the selection of two or more living body judgment processes from among the plurality of living body judgement processes, a state of the subject is detected by the judgement way determination section, and
the selection of two or more living body judgment processes by the judgement way determination section includes eliminating any living body judgement process that includes an action unsuitable for judging whether the subject contained in the image is of living body based on the detected state of the subject.

13. A non-transitory computer-readable recording medium storing a judgement program causing a computer to function as a judgement device, the judgement program causing the computer to function as:
a judgement way determination section for selecting two or more living body judgement processes among a plurality of living body judgement processes for judging whether a subject contained in an image is of living body, and determining an order of executing the two or more selected living body judgement processes;
an execution section for executing each of the two or more selected living body judgement processes in the determined order;
an output section for showing, in each of the two or more selected living body judgement processes, a subject an action required for the living body judgement process; a facial image acquisition section for acquiring a facial image containing a face of the subject when acting in accordance with the shown action; and a first judgement section for judging whether the subject is of living body based on a feature of a section of the face contained in the facial image; and
a second judgement section for determining whether judgement results obtained from the two or more selected living body judgement processes satisfy a predetermined condition, judging that the subject is of living body when the judgement results satisfy the predetermined condition, and judging that the subject is not of living body when the judgement results fail to satisfy the predetermined condition,
wherein, prior to the selection of two or more living body judgment processes from among the plurality of living body judgement processes, a state of the subject is detected by the judgement way determination section, and
the selection of two or more living body judgment processes by the judgement way determination section includes eliminating any living body judgement process that includes an action unsuitable for judging whether the subject contained in the image is of living body based on the detected state of the subject.

* * * * *